Jan. 26, 1971 S. PROSKOW 3,558,492
FERROMAGNETIC CHROMIUM OXIDE RECORDING MEMBERS
AND COMPOSITIONS STABILIZED WITH TERTIARY
AMINE-CONTAINING POLYMERS
Filed June 11, 1969

INVENTOR
STEPHEN PROSKOW

BY James H. Ryan
ATTORNEY

United States Patent Office 3,558,492

Patented Jan. 26, 1971

3,558,492

FERROMAGNETIC CHROMIUM OXIDE RECORDING MEMBERS AND COMPOSITIONS STABILIZED WITH TERTIARY AMINE-CONTAINING POLYMERS

Stephen Proskow, Wilmington, Del., assignor to E. I. du Pont de Nemours and Company, Wilmington, Del., a corporation of Delaware Continuation-in-part of application Ser. No. 665,022, Sept. 1, 1967, which is a continuation-in-part of application Ser. No. 661,379, Aug. 17, 1967. This application June 11, 1969, Ser. No. 832,080

Int. Cl. G03g *9/02, 13/08;* H01f *1/37*

U.S. Cl. 252—62.54 40 Claims

ABSTRACT OF THE DISCLOSURE

Described are magnetic recording members containing a ferromagnetic chromium oxide dispersed in a nonmagnetic organic polymeric binder system having improved stability achieved by incorporation in the binder of a basic synthetic polymer having tertiary amino nitrogen and the compositions of matter useful for making the recording members (and other magnetic devices).

RELATED APPLICATIONS

This application is a continuation-in-part of my now abandoned but then copending application Ser. No. 665,022, filed Sept. 1, 1967, as a continuation-in-part of my application Ser. No. 661,379, filed Aug. 17, 1967, and also now abandoned.

BACKGROUND OF THE INVENTION

(1) Field of the invention

This invention relates primarily to magnetic tapes and other magnetic recording members. More particularly, it relates to recording members containing a ferromagnetic chromium oxide as the magnetic component and to compositions from which the members and other magnetic devices are made.

(2) Description of the prior art and objects of the invention

The preparation of magnetic recording members of high quality from a ferromagnetic chromium oxide in a nonmagnetic synthetic organic polymeric binder material such as poly(vinyl fluoride) or poly(vinyl chloride) or the like has been described in Arrington U.S. Pat. 3,080,319. Similar members may be made with other binder materials such as the thermoplastic elastomeric polyurethanes of British Pats. 1,079,609, 1,132,956, 1,132,957 and 1,077,843 and Talley U.S. Pat. 3,144,352, the vinylidene chloride/acrylonitrile copolymers of Cox U.S. Pat. 3,278,263 and the nitrocellulose of Arthur U.S. Pat. 2,956,955. Many other binder materials may be used with ferromagnetic chromium oxide including those disclosed, for example, by Eichler et al. U.S. Pat. 3,247,-017, particularly the acrylate and methacrylate polymers. The use of acrylates, etc., as binders in magnetic tapes is also shown by Flowers U.S. Pat. 3,200,007. The Nacci Belgian Pats. 672,017 and 672,018 of May 9, 1966, list very many synthetic organic polymeric binder materials usable with ferromagnetic chromium oxide in magnetic applications.

Magnetic recording members in which anisotropic chromium oxide particles are highly oriented are especially well suited for storage of information. In any information storage system, however, it is desirable that the magnetic properties of the recording member be retained for long periods of time under conventional storage conditions so that all information stored in the recording member can be recovered completely whenever desired. While chromium oxide-containing recording members employing the above-mentioned, and other, conventional binders may have excellent magnetic properties when they are first prepared, some useful compositions undergo slow deterioration on storage in atmospheres of high humidity and temperature.

Ferromagnetic chromium oxide in the form of dry powder is stable and has been stored for many years with no detectable change. Furthermore, the powder is unaffected by prolonged heating in dry air at elevated temperatures. In contact with water, however, the oxide undergoes very slow degradation at a rate which may be affected by the nature of other chemical substances in its environment. The moisture frequently present in magnetic tapes is sufficient to start the degradation process, but the formation of a protective coating much like the formation of aluminum oxide on metallic aluminum retards the degradation. The stability of magnetic recording members is also influenced by certain polymeric materials used in the binder systems of the recording members to provide desired mechanical properties.

The principal objects of this invention are, therefore, to provide ferromagnetic chromium oxide-containing magnetic recording members of improved stability, i.e., members that retain their excellent magnetic and physical properties for long periods of time under conditions of high humidity and high temperature, and compositions of matter useful in preparing the members and other magnetic devices.

THE DRAWINGS

The above-mentioned and other objects are achieved in this invention by provision of a magnetic recording member or other ferromagnetic device made from a composition of matter comprising a ferromagnetic chromium oxide dispersed in a nonmagnetic synthetic organic polymeric binder, part of which is made up of a synthetic organic polymer containing a basic tertiary amine group and substantially the remainder of which is a conventional nonmagnetic synthetic organic binder material. Details of the invention will be evident from the description hereinafter and from the drawings in which.

DESCRIPTION OF THE INVENTION

Figure 1:
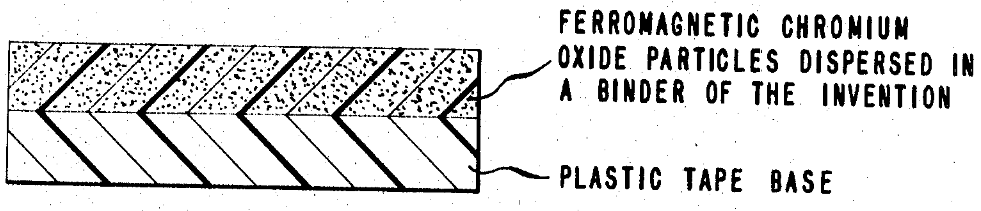
FIG. 1 shows a magnetic recording member, specifically a magnetic tape, in which a plastic tape base carries a magnetizable layer formed from ferromagnetic chromium oxide particles dispersed in a binder of the invention.

As noted above, magnetic recording members of the present invention contain a ferromagnetic chromium oxide dispersed in a nonmagnetic synthetic organic polymeric binder system, part of which is an organic ploymer containing tertiary amine groups. More specifically, in one aspect of the invention may be defined as an improved magnetic recording member (or other device) the magnetizable part of which is made from 1–98% (preferably, about 65–85%) by weight of ferromagnetic chromium oxide held within a binder system formed from a mixture of nonmagnetic synthetic organic polymers 1–90% (preferably 10–50%) of the volume of which is at least one basic tertiary amine-containing synthetic polymeric material containing at least 0.1% by weight of tertiary amino nitrogen, the tertiary amine moiety of said basic polymeric material having a $pK_a$ of 3–11 when measured in water at 20–35° C. The remaining ingredient of the binder system, in itself specifically optional, is at least one conventional nonmagnetic synthetic organic polymeric binder material, e.g., a binder material of the patents mentioned above. Other ingredients such as lubricants and crosslinking agents may be present, in minor amounts, as well.

The basic tertiary amine-containing polymeric material, which provides the improvement of this invention, can be represented as a polymer derived from monomer A-B, which terms A and B are defined further below. The monomer A-B may be employed either by itself, i.e., to form a homopolymer of monomer A-B, or, preferably, to form a copolymer of monomer A-B with one or more comonomers, M, which are also defined in further detail below. Preferably, the polymers are oxidation resistant. Useful tertiary amine-containing polymers are disclosed, for example, by Tamikado, Makromol. Chem. 38, 85 (1960), who describes the copolymerization of a vinylpyridine, 2-methyl-5-vinylpyridine, with styrene, methyl acrylate, methyl methacrylate, and acrylonitrile; Tamikado, J. Polym. Sci. 43, 489 (1960), who describes the copolymerization of other vinylpyridines, 2-vinylpyridine and 4-vinylpyridine, with styrene, methyl methacrylate and methyl acrylate; and Biswell et al., Ind. Eng. Chem. 47, 1598 (1955), who discuss acrylate and methacrylate copolymers of, for example, diethylaminoethyl methacrylate.

In the basic monomer A–B, the symbol A represents a moiety of the formula $$CA^1=\overset{\displaystyle X}{\overset{|}{C}}-Y_aZ_b-$$

which in the form of a suitable derivative A-R (in which a lower alkyl group R replaces the group B) is capable of addition copolymerization, and B represents a tertiary amine-containing moiety which, in the form of its derivative H-B (in which hydrogen replaces the group A), has a $pK_a$ of 3–11 when its conjugate acid is measured in water at 20–35° C. In this formula $a$ and $b$ are each 0 or 1, $R^1$ is hydrogen or fluorine, X is hydrogen, alkyl of 1–5 carbon atoms, phenyl, fluorine or chlorine, Y is $$-\overset{\displaystyle O}{\overset{\|}{C}}-$$

—O—, —$SO_2$—, or —SO— and Z is —O—, —S—, or $$-\overset{\displaystyle O}{\overset{\|}{C}}-$$

Especially preferred are those polymers derived from monomers A-B where the moiety A of the above formula contains $R^1$ as hydrogen, X as methyl or hydrogen, Y as $$-\overset{\displaystyle O}{\overset{\|}{C}}-$$

and Z as O—O, and $a$ and $b$ are each 1; where $R^1$ is hydrogen, X is hydrogen, and $a$ and $b$ are each 0; and where $R^1$ is hydrogen, X is hydrogen, Y is —O—, $a$ is 1 and $b$ is 0.

The tertiary amine-containing moiety B can be derived from various tertiary amines having the properties defined above. Operable tertiary amines that can be formed into A-B monomers include trialkylamines in which the alkyl groups contain 1–18 carbon atoms individually, e.g., triethylamine, ethyldimethylamine, tributylamine, octadecylethylmethylamine; dialkylarylamines in which the alkyl groups each contain 1–18 carbon atoms, e.g., N,N-diethylaniline, and including cyclic amines, e.g., N-phenylpiperidine; heterocyclic tertiary amines, e.g., pyridine, mono- and di-alkylpyridines in which the alkyl groups each contain 1–18 carbon atoms, e.g., 2-methylpyridine, quinoline, acridine, 1,3,5-triazines; 1-substituted imidazoles, e.g., 1-methylimidazole; 1-substituted benzimidazoles, e.g., 1-methylbenzimidazole; 1-substituted 1,2,3-triazoles, e.g., 1-methyl-4-phenyl-1,2,3-triazole. The tertiary amine-containing moiety B can also be derived from secondary dialkyl- and alkylarylamines in which the secondary amino nitrogen is joined directly to a vinyl ($CH_2$=CH—) group in the A moiety.

One or more such basic groups may be present in the H-B (or A-B) compound. For example, H-B can be

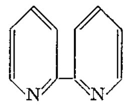

or $$CH_3CH_2-\overset{\displaystyle CH_3}{\overset{|}{N}}-CH_2CH_2-\overset{\displaystyle CH_3}{\overset{|}{N}}-CH_2CH_2-\overset{\displaystyle CH_3}{\overset{|}{N}}-CH_3$$

Especially preferred H-B compounds (from which the basic monomers A-B are derived) are triethylamine, ethyldimethylamine, pyridine, and 2-methylpyridine. These are combined with suitable A groups to form the copolymerizable A-B basic monomers.

Examples of specific homopolymers of the monomers A-B which are operable as polymeric binders in the magnetic recording members of this invention include:

poly[2-(N,N-dimethylamino)ethyl methacrylate],
poly[2-(N,N-dimethylamino)ethyl vinyl ether],
poly[p-(N,N-dimethylamino)styrene], and
poly[2-(piperidino)ethyl vinyl ether].

Examples of specific copolymerizable A-B monomers that can be used in preparing polymeric binders for the magnetic recording members of this invention include:

2-methyl-5-vinylpyridine,
2-vinylpyridine,
4-vinylpyridine,
3-isopropenylpyridine,
2-(N,N-dimethylamino)ethyl methacrylate,
2-(N,N-diethylamino)ethyl methacrylate,
2-(N,N-dimethylamino)ethyl acrylate,
2-(N-methyl-N-phenylamino)ethyl methacrylate,
2-(N,N-dimethylamino)ethyl vinyl ether,
2′-(N,N-dimethylamino)ethyl 1-methyl vinyl ether,
2-(piperidino)ethyl vinyl ether,
2-(N-methyl-N-phenylamino)ethyl vinyl ether,
1-vinylimidazole, and
p-(N,N-dimethylamino)styrene.

The comonomers M which can be copolymerized with the basic tertiary amine-containing monomers A-B comprise a wide variety of ethylenically unsaturated compounds which undergo addition polymerization. Operable monomers M include acrylic and methacrylic acid esters of alkanols having 1–18 carbon atoms and of $\beta$-perfluoroalkylethanols and $\omega$-hydroperfluoroalkylmethanols in which the polyfluoroalkyl group contains 1–17 and 2–18 carbon atoms, respectively, e.g., methyl methacrylate, butyl acrylate, ethyl acrylate, $\beta$-(perfluoropentyl)ethyl methacrylate, and $\alpha,\alpha,\omega$-trihydroperfluoropentyl methacrylate; acrylonitrile and methacrylonitrile; vinyl esters of carboxylic acids which contain 1–18 carbon atoms, e.g., vinyl acetate, isopropenyl acetate, vinyl trimethylacetate, vinyl laurate, and vinyl benzoate; styrene; ring-substituted halogen- and alkyl- (of 1–18 carbon atoms) styrenes, and styrenes substituted in the alpha-position with alkyl groups of 1–7 carbon atoms, e.g., 2,4-dichlorostyrene, 4-methylstyrene, $\alpha$-methylstyrene; olefins, e.g., ethylene, propylene, isobutylene; halogen-substituted olefins, e.g., vinyl chloride, vinyl fluoride, vinylidene chloride, vinylidene fluoride, tetrafluoroethylene and hexafluoropropylene; vinyl and halovinyl ethers, e.g., methyl vinyl ether, methyl isopropenyl ether, and perfluoroalkyl perfluorovinyl ethers in which the perfluoroalkyl groups contain 1–7 carbon atoms.

Especially preferred comonomers M for copolymerization with the basic tertiary amine-containing monomers A-B described above are the following: methyl methacrylate, butyl methacrylate, 2-(perfluoroalkyl)ethyl methacrylate, methyl acrylate, butyl acrylate, acrylonitrile, styrene, and vinylidene chloride.

Examples of specific copolymers of M with A-B which are operable as binders in the magnetic recording members of this invention include:

vinyl acetate/2-(N,N-dimethylamino)ethyl methacrylate,
styrene/2-methyl-5-vinylpyridine,
styrene/2-(N,N-dimethylamino)ethyl methacrylate,
vinylidene chloride/acrylonitrile/2-methyl-5-vinylpyridine,
tetrafluoroethylene/methyl vinyl ether/2-(N,N-dimethylamino)ethyl vinyl ether,
tetrafluoroethylene/2-(N,N-dimethylamino)ethyl acrylate/methyl vinyl ether,
tetrafluoroethylene/vinyl acetate/2-(N,N-dimethylamino)ethyl vinyl ether,
tetrafluoroethylene/vinyl acetate/2-(N,N-diethylamino)-ethyl methacrylate,
ethylene/vinyl acetate/2-(N,N-dimethylamino)ethyl methacrylate,
methyl vinyl ether/2-(N,N-dimethylamino)ethyl methacrylate,
methyl vinyl ether/2-(N,N-dimethylamino)ethyl vinyl ether,
α-methyl styrene/2-methyl-5-vinylpyridine,
vinyl chloride/methyl methacrylate/2-methyl-5-vinylpyridine,
methyl methacrylate/vinyl acetate/2-methyl-5-vinylpyridine,
1,1-dihydroperfluorobutyl methacrylate/2-(N,N-dimethylamino)ethyl methacrylate,
methyl methacrylate/butyl methacrylate/2-methyl-5-vinylpyridine,
methyl methacrylate/butyl acrylate/2-methyl-5-vinylpyridine, and
butyl methacrylate/butyl acrylate/2-methyl-5-vinylpyridine.

The preparation of the tertiary amine-containing polymers can be carried out by polymerizing the basic monomers A-B by conventional addition polymerization procedures, e.g., in bulk, solution, suspension, emulsion or dispersion systems with peroxide, redox, or azo initiators or with radiant energy, e.g., ultraviolet light or X-rays, as the initiator. The copolymers containing both M monomers and A-B monomers can be prepared similarly by the conventional procedures outlined above with the desired proportions of M comonomers and A-B comonomers employed. These can include random, block or graft type copolymers.

The preparation of representative tertiary amine-containing polymers useful in the binder systems of the magnetic recording members of this invention is described in greater detail below:

In an atmosphere of nitrogen, a 2-liter reaction vessel is charged with 360 g. of methyl methacrylate, 20 g. of 2-methyl-5-vinylpyridine, 2.0 g. of α,α'-azodiisobutyronitrile, 680 ml. of benzene. The mixture is stirred and heated in a water bath to 80° C. Beginning at 15 minutes after reaching 80° C., addition of a solution of 15 g. of 2-methyl-5-vinylpyridine in 30 ml. of benzene is carried out as follows: ⅔ of the solution is added over the next ¾-hour period, followed by 0.25 g. of α,α'-azodiisobutyronitrile in 5 ml. of benzene; then the remaining ⅓ of the solution is added over the next hour, followed by an additional 0.25 g. of α,α'-azodiisobutyronitrile in 5 ml. of benzene. After an additional hour at 80–81° C., the clear solution is cooled to room temperature and there is obtained 953 g. of yellow solution of 30.6% by weight solids content. The solid polymer is isolated from 120 g. of this solution by adding it with stirring to several volumes of cyclohexane, filtering the precipitated solid, reslurrying the solid with cyclohexane, filtering, and drying to give 33.8 g. of white, finely divided, solid polymer. Analysis shows 1.15% nitrogen, which corresponds to 9.8 weight percent of 2-methyl-5-vinylpyridine. The inherent viscosity measured at 0.5 w./v. percent concentration in chloroform at 25° C. is 0.24.

In an atmosphere of nitrogen, a 2-liter reaction vessel is charged with 310 g. of methyl acrylate, 12 g. of 2-methyl-5-vinylpyridine and 630 ml. of benzene. The mixture is stirred and heated to 80° C. at which time 2.0 g. of α,α'-azodiisobutyronitrile dissolved in 50 ml. of benzene is added. During the 1-hour period after this addition, there is gradually added 50 ml. of benzene solution containing 28 g. of 2-methyl-5-vinylpyridine. After an additional 1.25 hours at 80° C. the mixture is cooled, giving 873 g. of a yellow, moderately viscous solution of 27.0% solids content. A 100-g. portion of this solution is precipitated by adding it to several volumes of hexane, cooling in an ice bath and stirring. The soft polymer is dried and redissolved in benzene. The benzene solution is cast as a thin layer over a polytetrafluoroethylene sheet and the thin film is dried in vacuum at 45° C. to remove solvent. The soft polymer stripped from the polytetrafluoroethylene sheet amounts to 16.2 g. Analysis shows 1.83% nitrogen, which corresponds to 15.5 weight percent of 2-methyl-5-vinylpyridine in the copolymer. The inherent viscosity measured at 0.5 w./v. percent concentration in chloroform at 25° C. is 0.49.

Other polymers suitable for use in magnetic recording members can be prepared by similar methods or conventional modifications of these methods. Thus, other free radical-generating initiators, other solvents, other temperatures, and other reaction times are suitable for polymerizing monomers A-B alone with one or more monomers M. Likewise, in addition to the solution method described above, bulk, suspension, and emulsion polymerization methods are also operable.

The tertiary amino group can also be introduced by chemical reaction with a preformed copolymer, e.g., by reaction of a secondary amine with a halide-containing copolymer as indicated by the following equation:

$$\text{polymer—OCH}_2\text{CH}_2\text{Cl}+\text{HNR}_2 \rightarrow \text{polymer—OCH}_2\text{CH}_2\text{NR}_2$$

Besides the addition copolymers described earlier, condensation polymers containing tertiary amine groups can be used as stabilizers in magnetic recording members. Suitable tertiary amine-containing condensation polymers can be made, for example, by reacting a polyester containing a halogen substituent with a secondary amine, or by condensing a dicarboxylic acid with a glycol having tertiary amine substituents.

In addition to its effect on the stabilization of the magnetic recording member, the basic tertiary amine-containing polymeric component of the binder system also acts as a dispersing agent and as a binder for the chromium oxide particles. All three of these properties are generally involved simultaneously in the recording member composition.

The particular structure of the basic polymer component of the binder composition is important in attaining maximum stability of chromium oxide-containing magnetic recording members. Polymeric materials that are free of easily oxidizable functions are less reactive with ferromagnetic chromium oxide and are therefore preferred "backbone" polymers in the binder systems, i.e., the polymer component with which the tertiary amine-containing comonomer is copolymerized. It is essential that the amino moiety of the polymer be a tertiary amine; secondary and primary amine-containing polymers are not particularly effective in producing the desired result since these groups can be oxidized by ferromagnetic chromium oxide. Structural features also influence the solubility and dispersing properties of the polymeric binders, as well as the physical properties exhibited by the final magnetic recording member.

The base strength of the tertiary amine moiety of the polymeric binder influences the stabilizing action of the binder system. In general, stabilizing action increases with increase in base strength of the amine. As indicated hereinbefore, the base strength of the amine moiety of the polymer preferably has a $pK_a$ between 3 and 11 (when its conjugate acid is measured in water at 20–35° C.). [For information on $pK_a$ values of organic molecules, see A. Albert and E. P. Serjeant, "Ionization Constants of Acids and Bases," John Wiley and Sons, Inc., New York (1962), pp. 140–141 and 144–145. Also, see E. A. Braude and F. C. Nachod, "Determination of Organic Structures by Physical Methods," Academic Press, New York (1955), chap. 14, "Dissociation Constants," p. 567, and Y. Yukawa, editor, "Handbook of Organic Structural Analysis," W. A. Benjamin, Inc., New York (1965), pp. 584–613.] Binders containing an amine moiety having a $pK_a$ below 3 generally produce much less stabilization. The use of binders having an amine moiety with a $pK_a$ above 11 sometimes has a deleterious effect on the binder system. For example, some very highly basic polymers have an adverse effect on dispersibility of the chromium oxide particles, and in some cases agglomeration of the particles might occur.

The stabilizing action of the basic tertiary amine-containing copolymer usually increases with increasing proportions of the basic component A-B within the range of 2% to 50% of the weight of *A-B/M* copolymer. In some cases, the stabilizing action of homopolymers of the type A-B is less than that of copolymers of the same A-B monomers with additional comonomers M. On the other hand, the dispersing action of the binder system tends to be optimum (other things being equal) when the proportion of the tertiary amine-containing comonomer is about 10–20% by weight in the *A-B/M* copolymer. The base strength of the amine moiety and the molecular weight and uniformity of the basic polymer are other factors that influence dispersibility.

The molecular weight of the tertiary amine-containing polymer in the binder system has a significant effect on the dispersing action of the system. In general, the dispersing action increases with a lowering of the molecular weight of the polymer. On the other hand, variation in the molecular weight of the amine-containing polymer does not significantly change the stabilizing action of the polymer. When the tertiary amine-containing polymer is a substantial part of the binder system in the magnetic recording member, it is generally preferred to employ higher molecular weight polymers. If desired, a mixture of low molecular weight and high molecular weight tertiary amine-containing polymers can be employed in the binder system. In such a case, the low molecular weight polymer provides dispersing action and the high molecular weight polymer provides binding action.

In previously known magnetic tape coating formulations, conventional dispersing agents are generally incorporated in the formulation at a level of 3–6% by weight (or about 15–30% by volume) of the magnetic oxide. This amount appears to be enough to completely "wet" the surface of the oxide, and additional quantities usually do not substantially improve dispersion quality. It is also desirable to incorporate such conventional dispersing agents only in minor amounts since these materials usually have deleterious effects on the physical properties of the binder system. Polymeric dispersing agents, on the other hand, can be considered as binder components as well as dispersing agents and larger amounts can be included in the system.

The tertiary amine-containing polymers behave essentially like the low molecular weight conventional dispersing agents so that a concentration of 3–6% (by weight) generally gives adequate dispersing action. The maximum concentration employed will depend largely on the physical effects produced by the added polymer on the final recording member since stabilization generally increases with increasing amount of the tertiary amine-containing polymer. This particular component will generally be used in the maximum proportions possible within the range of optimum physical properties desired for the system. In any particular case, the amount employed will depend on the particular binder system and the physical properties of the polymeric additive. For example, in some cases it is desirable to use the tertiary amine-containing polymer at 3–6 weight percent of the chromium oxide, while in other systems increasing the amount of tertiary amine-containing polymer up to 50% by volume of the total binder system produces large increments of added stabilization and certain desired physical properties. Optimum useful properties are generally achieved when the tertiary amine-containing polymer component comprises 10–50% by volume of the total organic solids present in the formulation.

As indicated above, the basic tertiary amine-containing polymers included in the binder systems of the present invention usually act as effective dispersing agents. However, in some cases, the dispersing action is not as great as desired, and in these cases conventional, low molecular weight dispersing agents can also be included in the binder system. In such cases, the basic polymeric component functions both as a stabilizing agent and as a binder, while the primary dispersing action is provided by the added low molecular weight dispersing agent. The stabilizing action so obtained, however, is generally less than that achieved with only a basic tertiary amine-containing polymer present as the dispersing agent. The actual stability of such compositions is to a great extent dependent on the stability of the added conventional dispersing agent.

The basic tertiary amine-containing polymer amounts to from 1–90% by volume of the total binder system in the magnetic recording members of this invention. From the standpoint of optimum combination of stability, magnetic properties, and physical properties, it is preferred that the tertiary amine-containing polymer amount to 10–50% of the volume of the binder system. These proportions allow for the presence of other polymeric binders which are often desired to impart particular properties to the magnetic recording member. For example, in some cases it is desirable to incorporate other polymers to impart particular strength characteristics, increase surface uniformity and smoothness, and the like. Such optional ingredients in the binder systems can be commercially available polymers commonly used in preparing magnetic tapes, or they can be polymers that are prepared by addition polymerization or condensation polymerization from commercially available monomers.

As noted previously, in addition to the 1–90% by volume of the tertiary amine-containing A-B or A-B/M polymers, the binder systems of this invention contain admixed therein 99–10% by volume of at least one other, and conventional nonmagnetic synthetic organic polymeric binder material. A wide variety of known nonmagnetic synthetic organic polymeric binder materials may be used in this binder system and the complete system may be employed to bind or hold together 1–98% by weight of particulate ferromagnetic chromium oxide. These polymeric binders are substantially nonreactive toward ferromagnetic chromium oxide in the presence of tertiary amine-containing polymeric stabilizer-dispersants. The polymeric binder materials vary considerably in physical properties, however, and thus the particular polymer chosen depends on the physical properties required for the intended use. The binders may be of thermoplastic or thermosetting type.

Suitable nonmagnetic synthetic organic polymeric binder materials are described, for example, in the Nacci Belgian Pats. 672,017 and 672,018, in Arrington U.S. Pat. 3,080,319, in the other patents mentioned above, and by C. B. Pear, Jr., in "Magnetic Recording in Science and Industry," Reinhold Publishing Corporation, 1967, pp. 69–70. These materials include the various unsubstituted and substituted acrylate and methacrylate polymers; the various vinyl and vinylidene polymers and copolymers such as the vinyl butyral, acrylonitrile, vinyl chloride, vinyl fluoride, vinylidene fluoride, vinyl chloride/vinyl acetate, vinylidene chloride/vinyl acetate, vinylidene chloride/acrylonitrile, and vinyl chloride/vinyl fluoride polymers; the various olefinic polymers and copolymers such as polyethylene, polypropylene, poly(ethylene/vinyl acetate), poly(ethylene/vinyl chloride) and the like; the alkyd-based varnish and drying oil-type formulations; the polymers derived from naturally occurring polymeric materials such as regenerated cellulose, cellulose acetate, cellulose propionate, cellulose acetate-propionate, and the like, the synthetic condensation polymers such as nylons, polyesters, polyurethanes and polyester-polyurethanes, e.g., polycaprolactam, poly(hexamethylene adipamide), poly(hexamethylene sebacamide), poly(ethylene terephthalate) polyurethanes from reactions of glycols and diisocyanates, polyester-polyurethanes from reactions of diisocyanates (e.g., diphenylmethane diisocyanate), dibasic acids (e.g., adipic), and alkanediols, and polyurethanes based on relatively high molecular weight glycols such as obtained by ring opening of tetrahydrofuran, with, if desired, a finishing diamine such as hexamethylenediamine, and the like; the mixed ester-amides and synthetic condensation polymers derived therefrom such as polyhydroxymethyl poly(hexamethylene adipamide), and the like; the thermosetting resins such as, for instance, the poly(urea-formaldehyde) and modified poly(urea-formaldehyde) compositions wherein the modifying component can be, for instance, an amine such as hexamethylenediamine and the like; the epoxy and polycarbonate resins; etc. Dependent upon the end use, cross-linking agents, lubricants, mold release agents, low molecular weight surfactants and/or fungicides may be incorporated in the ferromagnetic chromium oxide-binder compositions.

Additional polymeric ingredients or binder materials which are preferred according to this invention for mixture with the A-B or A-B/M polymers are, however, either one or more commercially available polymeric maerials, commonly polyester-polyurethane elastomers and mixtures of polyester-polyurethane elastomers and vinylidene chloride/acrylonitrile copolymers, or the homopolymers and copolymers of acrylic and methacrylic acid esters and their copolymers with polymerizable ethylenically unsaturated monomers.

The preformed polyester-polyurethane elastomers may be used either alone or with other known polymeric materials, such as vinyl chloride/vinyl acetate copolymers and vinylidene chloride/acrylonitrile copolymers. Many such polyester-polyurethane elastomers are commercially available and their properties and characteristics are well known to those skilled in the art. Of these elastromeric polymers, preferred are polyester-polyurethanes such as are described, for example, in Coffey, et al. U.S. Pat. 2,606,162, Schollenberger U.S. Pat. 2,871,218, Parker U.S. Pat. 2,883,433, and Harz et al. U.S. Pat. 2,978,414. Particularly preferred elastomers are the commercially available (organo-) soluble polyester-polyurethane resins based on diphenylmethane diisocyanate, adipic acid, and an alkanediol having 2–4 carbon atoms for example, ethylene glycol, propanediol and butanediol, or mixtures of such alkanediols. Especially preferred binders are those in which these particularly preferred elastomers are used alone and those in which they are used in conjunction with vinylidene chloride/acrylonitrile copolymers.

Binder materials may be crosslinked and/or hardened by agents such as polyisocyanates, e.g., 4,4′-methylenebis-(cyclohexylisocyanate) and the trifunctional 2,4-toluene diisocyanate/trimethylol propane (3/1), melamine-formaldehyde resins such as described, for example, in U.S. Pat. 3,144,353, phenol-formaldehyde resins such as described, for example, in U.S. Pats. 3,104,983 and 3,049,-442, Shell Oil Company Epon® epoxide resins, and the like. Likewise, lubricants, e.g., stearamide, may be incorporated in the coating formulations to lessen friction during use. Other lubricants that may be used include hydrocarbyl silicone oils, e.g., Dow Corning's DC-200, substituted amides, e.g., N,N-dimethyl lauramide, squalane, long chain esters, e.g., butyl stearate, butoxyethyl stearate, butyl laurate, butyl palmitate, Vydax® fluorocarbon telomers, and the like.

Operable preformed polymeric binder materials of the second preferred binder system of the invention, i.e., that of acrylic or methacrylic acids esters or copolymers of the same with other polymerizable ethylenically unsaturated monomers, may be derived from a variety of acrylic and methacrylic acid ester monomers. A preferred combination of this binder system of the invention, however, comprises methyl methacrylate/2-methyl-5-vinylpyridine copolymer as the tertiary amine-containing synthetic polymeric material and butyl methacrylate/butyl acrylate copolymer as the additional preformed polymer. It will be appreciated that acrylic or methacrylic binder materials may be optionally employed with crosslinking and/or hardening agents and also with lubricants as noted above.

Acrylate and methacrylate polymers are discussed at length, for example, in George E. Ham, "Copolymerization," Interscience Publishers, N.Y. (1964), chapter XII and appendix A thereto, and in E. H. Riddle, "Monomeric Acrylic Esters," Reinhold Publishing Co., New York (1954), chapters IV and V, particularly. Suitable acrylic and methacrylic acid ester homopolymers are those in which the alkyl ester group is hydrocarbyl or halohydrocarbyl of 1–18 carbon atoms, e.g., methyl, ethyl, propyl, butyl, 2-ethylhexyl, octadecyl, and trihydroperfluoropentyl. It is desirable to employ the more rubbery types of tertiary amine-containing synthetic polymeric materials when lower alkyl acrylate and methacrylate homopolymers are used. Copolymers, i.e., *inter se* copolymers, of acrylic and methacrylic acid esters are preferred to homopolymers, especially those derived from monomeric methyl methacrylate, butyl methacrylate, butyl acrylate, and ethyl acrylate, e.g., poly(butyl methacrylate/butyl acrylate) and poly(methyl methacrylate/butyl acrylate).

Many ethylenically-unsaturated monomers may be copolymerized with acrylic and/or methacrylic acid ester monomers to obtain operable preformed polymers, e.g., 4-hydroxybutyl vinyl ether, 2-methyl-5-vinylpyridine, vinyl acetate, vinylidene chloride, N-methylacrylamide, 2-tertiary-butylaminoethyl methacrylate, 2-hydroxyethyl methacrylate, glycidyl methacrylate, methacrylamide, etc.

Specific examples of some operable, preformed acrylic and methacrylic acid ester homopolymers and copolymers (by weight) which can be prepared as described below and for use in admixture with tertiary amine-containing polymeric materials in the respective volume proportions of 1–90:99–10 are as follows:

methyl methacrylate/butyl methacrylate (50/50)
methyl methacrylate/butyl acrylate (50/50)
methyl methacrylate/butyl acrylate (25/75)
butyl methacrylate/butyl acrylate (50/50)
ethyl acrylate homopolymer
butyl acrylate homopolymer
butyl methacrylate/butyl acrylate/2-hydroxyethyl methacrylate (45/45/10)
butyl methacrylate/butyl acrylate/4-hydroxybutyl vinyl ether (45/45/10)
butyl methacrylate/butyl acrylate/glycidyl methacrylate (45/45/10)
butyl methacrylate/butyl acrylate/N-methacrylamide (42/42/16)
butyl methacrylate/butyl acrylate/methacrylamide (45/45/10)
butyl methacryate/butyl acrylate/2-tertiary-butylaminoethyl methacrylate (45/45/10)

butyl methacrylate/butyl acrylate/2-methyl-5-vinyl-pyridine (42/42/16)
methyl methacrylate/butyl acrylate/2-methyl-5-vinyl-pyridine (42/42/16)
vinyl acetate/butyl acrylate (25/75)
vinyl acetate/butyl acrylate (50/50)
vinylidene chloride/butyl acrylate (50/50)
vinylidene chloride/2-ethylhexyl acrylate/acrylic acid (49/49/2)
vinylidene chloride/methyl acrylate/butyl methacrylate/acrylic acid (10/19/69/2)

Homopolymers and copolymers of acrylic and methacrylic acid esters and their copolymers with other polymerizable vinyl monomers, preferred as binder materials for use with tertiary amine-containing synthetic polymeric materials, may be prepared by conventional addition polymerization procedures, e.g., in bulk, solution, suspension, emulsion or dispersion systems employing customary peroxide, redox, or azo initiators or radiant energy, e.g., ultraviolet light or X-rays, as the initiator. Suitable emulsion and solution methods of polymerization are described immediately hereinafter:

(1) A reactor is charged in an atmosphere of nitrogen with distilled water, a dispersing agent, e.g., sodium lauryl sulfate anionic dispersant or Arquad® HT–50 N-alkyltrimethylammonium chloride cationic dispersant, and monomer(s) in desired ratio. 1-dodecanethiol may be used to control molecular weight. Potassium persulfate/sodium bisulfite is a suitable initiator for effecting polymerization at 40° C. and azobisisobutyramidine hydrochloride for effecting polymerization at 65° C. The mixture is stired in an atmosphere of nitrogen for 4–8 hours, and the resulting emulsion is cooled and filtered, if necessary, through moderately coarse filter media to separate any agglomerates. Polymer is recovered from the filtrate by precipitation with calcium chloride or by evaporation of solvent, washed and dried in vacuo. The polymer may also be recovered from the emulsion by other methods, e.g., by drum drying or freeze coagulation. The polymers are characterized by known methods, e.g., by elemental analysis, by differential thermal analysis, and by inherent viscosity. Polymers prepared by emulsion polymerization usually have higher inherent viscosities than those prepared by solution polymerization; and (2) The desired monomers are dissolved in methyl isobutyl ketone or benzene in an atmosphere of nitrogen, Vazo® vinyl polymerization catalyst (azobisisobutyronitrile) is added, and the solution is heated at 80° C. for 7–9 hours. Meanwhile, additional initiator is added, if desired, after 2–3 hours. The polymer is isolated by evaporation of the solvent and washed in comminuted form with hexane, dried, and characterized as described above.

Preparation of a specific butyl methacrylate/butyl acrylate (50/50) copolymer is described in detail immediately hereinafter.

A 5-liter flask is flushed with nitrogen and charged with 1750 ml. of distilled water through which nitrogen is bubbled for 20 minutes with stirring. Ten grams of Duponol® ME sodium lauryl sulfate surfactant is dissolved in water and a mixture of 250 g. of butyl methacrylate, 250 g. of butyl acrylate (both commercial grades), and 1.0 g. of n-dodecanethiol is added with stirring. The mixture is heated to 40° C. by means of a water bath and, while continuing flushing with nitrogen, there is added a solution of 5 g. of potassium persulfate in 120 ml. of distilled water followed by a solution of 2.5 g. of sodium bisulfite in 120 ml. of distilled water. The mixture is stirred for 6 hours at 40–45° C., controlling a slight exotherm that develops after about 1 hour by ice-bath cooling. At the end of the reaction period, the mixture is cooled and filtered through coarse fluted filter paper to remove about 2.5 g. of coagulated material. The filtrate consists of 2439 g. of a milky fluid emulsion containing about 20 weight per cent polymer. A portion of the polymer, isolated by coating on glass and drying in a vacuum oven, has an inherent viscosity of 1.94 (0.1 w./v. percent solution in $CHCl_3$ at 25° C.). The polymerization procedure is repeated 9 times. Inherent viscosity varies slightly from lot to lot. For example, another lot of the polymer has an inherent viscosity of 1.82 and a glass transition temperature, $T_g$, of −35° C. as determined by thermogravimetric analysis (TGA).

The butyl methacrylate/butyl acrylate (50/50) copolymer is recovered by 17 separate precipitations, each conducted in a 5-gallon stainless steel tank fitted with an air-driven stirrer. In each run, 5 liters of cold water is placed in the tank and 1250 g. of the 20% by weight butyl methacrylate/butyl acrylate emulsion is added. Over a 30-minute period, a solution of 12.5 g. of $CaCl_2 \cdot 2H_2O$ in 3125 ml. of cold water is added, followed in the next 20–30 minutes by addition of 6.3 g. $CaCl_2 \cdot 2H_2O$ in 625 ml. of cold water. During the second addition, a flocculated suspension of polymer resembling cottage cheese forms. Volume is adjusted to 4 gallons with cold water and the mixture is stirred for 15–20 minutes. Precipitated polymer is separated by pouring the dispersion through a stainless steel wire filter. The polymer is then washed by dispersing it in water in a large Waring "Blendor", squeezed between rollers, and completely dried as thin sheets in an oven at 50° C. From a total of about 45 pounds of emulsion, the yield of dry, rubbery polymer with an inherent viscosity of 1.70 (0.5 w./v. percent in $CHCl_3$ at 25° C.) and a $T_g$ of −34° C. is 8.2 pounds.

The ferromagnetic chromium oxide used in the magnetic recording members of this invention is preferably a chromium oxide in single crystal, acicular form that possesses magnetocrystalline anisotropy with a unique axis of easy magnetization which coincides more or less with the acicular axis. The preparation of suitable forms of ferromagnetic chromium oxide is described, for example, in U.S. Pats. Oppegard 2,885,365, Ingraham and Swoboda 2,923,683, Ingraham 2,923,684, Arthur 2,956,955, Ingraham and Swoboda 3,034,988 and Cox 3,278,263. Also suitable are ferromagnetic chromium oxides prepared as described in these patents, then subjected to after-treatments such as the upgrading described in the assignee's copending application of Bottjer and Cox, Ser. No. 705,029, filed Feb. 13, 1968, and the stabilizing treatment described in the assignee's copending application of Bottjer and Ingersoll, Ser. No. 732,109, filed May 27, 1968. The amount of ferromagnetic chromium oxide used in the magnetic recording members can range from 1% to 98%, by weight.

Figure 2:
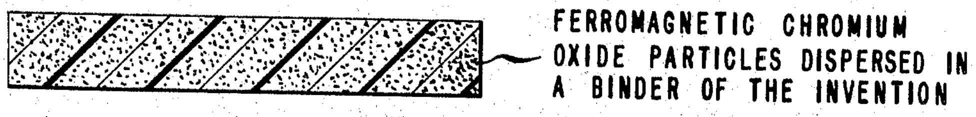
FIG. 2 shows an integral tape, i.e., one in which the magnetizable layer is formed from a binder carrying ferromagnetic chromium oxide particles without need of a base.

The magnetic recording members of this invention can be prepared by any of the methods known in the art for making magnetic recording members. For example, the methods described in the above-mentioned U.S. Pat. 3,080,319 to C. H. Arrington for preparing coated tapes or integral tapes can be used for the preparation of similar tapes employing the basic tertiary amine-containing polymeric binder systems of this invention. The tertiary amine-containing binder system can be applied as a coating (see FIG. 1) to film or tape made of common polymeric materials by any of the methods known in the art such as, for instance, solution coating, melt coating, or dispersion coating. A particularly useful coating technique is the gravure-coating procedure described in assignee's copending application of Long, Ser. No. 540,915, filed Apr. 7, 1966, carried out with apparatus such as that described in Long, U.S. Pat. 3,392,701. Preferably, the coating compositions are subjected to shear, such as provided by well-known pigment dispersing mills, e.g., sand-grinding mills, roller mills and ball mills. Suitable sand-grinding mills are described in U.S. Pats. 2,581,414 and 2,855,156. The tertiary amine-containing binder systems of the invention can also be formulated for preparation of integral magnetic tapes, i.e., tapes in which the chromium oxide-binder composition is used without a backing strip to form a complete magnetic recording member (see FIG. 2).

A convenient procedure for preparing magnetic tapes for comparative purposes is as follows: A quantity of a basic tertiary amine-containing polymer, sufficient to provide in the final binder system at least 0.1% amino nitrogen, is dissolved in a suitable solvent. The solution is placed in a container and there are then added a quantity of acicular ferro-magnetic chromium oxide particles and an amount of Ottawa sand approximately equal to 2–3 times the weight of oxide. The container is closed and placed in a commercial paint conditioner. The ingredients are "slurry-milled" for a period of about 45 minutes of oscillation of the container at, for example, about 1000 cycles per minute. The milled mixture is transferred to a larger container holding a solution of the other polymeric binder(s) to be incorporated in amount sufficient to provide a final binder system containing 35–55% by volume of chromium oxide particles. This mixture is then milled for several minutes in the paint conditioner. The mixture is removed from the container and pressure-filtered through a nylon cloth pad on a metal screen having a two-micron filter rating (i.e., 98% of material having particle size greater than 2 microns does not pass through) to remove the sand. The filtered solution can be adjusted to the desired viscosity by addition of further solvent if necessary. If desired, other ingredients, e.g., other dispersing agents or other modifying agents such as crosslinking (hardening) agents, lubricants, and the like, can be incorporated in the coating solution at various stages in the milling after the basic tertiary amine-containing polymer is milled with the chromium oxide particles.

The dispersions prepared as described above are uniformly coated on a base film, e.g., a film made of poly(ethylene terephthalate), smoothyl supported on a suitable plate, by means of a doctor knife adjusted to give a coating of the desired thickness. The wet films are promptly passed between opposing magnets having an orienting field strength sufficient to align the magnetic particles in parallel fashion. The coated tape containing the oriented chromium oxide particles is then allowed to dry under cover overnight at room temperature. The resulting coated tapes are then aged under various conditions for testing their stability. When the tapes are to be tested for magnetic properties, they may first be subjected to calendering at elevated temperatures and pressures, the exact temperature and pressure being dependent on the particular composition of the coating and base tape. When the magnetic compositions in the tapes contain crosslinking (hardening) agents, the tapes are cured at ordinary or elevated temperatures for periods of time sufficient to produce hardening of the coatings.

The effectiveness of the basic tertiary amine-containing binder systems in their stabilizing action can be determined by measuring certain magnetic and physical properties after the tapes have been subjected to various accelerated aging conditions. The tape samples are enclosed in individual bottles that contain a humectant to provide the desired humidity conditions and then stored in a circulating air oven maintained at desired temperatures. Agings are carried out at 65° C. and 50% relative humidity by using a mixture of 2 volumes of water with 1 volume of concentrated sulfuric acid as a humectant. In these greatly accelerated aging tests, the effect of humidity at these elevated temperatures on degradation is generally large; the higher the humidity, the faster the degradation.

Aging effects can best be monitored by following the decrease in residual intrinsic flux density, $\phi_r$, per ½ inch, exhibited by five 2-inch squares of tape and by measuring the slow increase in the coercivity, ${}_IH_C$, of the tapes. While losses in $\phi_r$ and increases in ${}_IH_C$ provide good tests, they do not accurately reflect the performance of the tapes. The output ($E_o$) of peak-to-peak signal voltage, usually with an increase in ${}_IH_C$ and this compensates to a large degree for losses in $\phi_r$. Furthermore, a 10% loss in $\phi_r$ corresponds to only 1 db loss and 1db is about the minimum change in tape performance which can be measured. The accelerated tests show that degradation occurs rapidly initially and the rate then decreases due to formation of a protective coating on the surface of the oxide. Changes in $\phi_r$ are expressed as the time in days required for a 10% loss in initial $\phi_r$. This loss is residual intrinsic flux density is termed the $t_{10}$ value. In comparing $t_{10}$ values of different tapes, it should be kept in mind that the percent loss in $\phi_r$ in any given tape is generally dependent on the coercivity and the degree of dispersion of the chromium oxide in the binder system.

The intrinsic coercive force, ${}_IH_C$, and the residual intrinsic flux density, $\phi_r$, are measured on a DC ballistic-type apparatus which is a modified form of the apparatus described by Davis and Hartenheim in "Review of Scientific Instruments" 7, 147 (1936).

The peak-to-waist ratio, *P/W*, is a measurement of the magnetic properties of the tape which indicates magnetic loop squareness. In general, the higher the *P/W* value, the more suitable is the tape for magnetic recording members. The *P/W* ratio is measured on the first time derivative of a hysteresis loop curve generated by a 60 c.p.s. alternating electric filed. The derivative curve is available as an oscilloscope display on a standard commercial B/H meter, for example, such a meter as provided by Scientific Atlanta, Model 651B. The *P/W* value is the ratio of the peak amplitude of the derivative curve to the waist amplitude at zero field in the derivative curve.

The output (response) of the magnetic tapes prepared as described above can be measured in commercial tape recorders at 30 kc. saturation without bias, and their output is found to be approximately the same as the output of other types of commercial tapes.

When tapes of the compositions defined herein are made by more refined procedures, they exhibit an output appreciably better than that of present commercial tapes. Compounded and tested as described above, compositions that are especially useful in forming magnetic recording members of this invention, either with a plastic tape base (FIG. 1) or without (FIG. 2), include particularly those described in the following Table A. In this table and in the various examples and accompanying tables that follow hereinafter, the abbreviated term "preformed polyester-polyurethane resin" will be used for convenience of expression to designate the particularly preferred, commercially available, soluble, elastomeric, polyester-polyurethane resins hereinbefore defined, viz, those resins based on diphenylmethane diisocyanate, adipic acid, and an alkanediol having 2–4 carbon atoms or mixtures of such alkanediols.

TABLE A.—MAGNETIC TAPE COMPOSITIONS

| | Compositions containing a ferromagnetic chromium oxide, weight percent |
|---|---|
| Formulation A: | |
| Ferromagnetic chromium oxide | [1,2] About 68–84 |
| Preformed polyester-polyurethane resin | 12–25 |
| Methyl acrylate/2-methyl-5-vinylpyridine (90/10 to 80/20) copolymer | 2–8.0 |
| 2,4-toluene diisocyanate/trimethylolpropane about (3/1), crosslinking (hardening) agent | 0.2–5.0 |
| Lubricant(s) | 0.1–2.0 |
| Formulation B: | |
| Ferromagnetic chromium oxide | [1,2] About 65–84 |
| Mixture (60/40 to 40/60) of preformed polyester-polyurethane resin with vinylidene chloride / acrylonitrile copolymer (80/20) | 13–26 |
| Methylmethacrylate/2-methyl-5-vinylpyridine (90/10 to 80/20) copolymer | 2–7.5 |
| 2,4-toluene diisocyanate/trimethylolpropane (about 3/1), crosslinking (hardening) agent | 0.2–3.0 |
| Lubricant(s) | 0.1–2.0 |

Formulation C:

| | |
|---|---|
| Ferromagnetic chromium oxide ---- [1 2] | About 73–85 |
| Preformed butyl methacrylate/butyl acrylate copolymer (about 50/50) ---------- | 10–25 |
| Methyl methacrylate/2-methyl-5-vinylpyridine (90/10 to 80/20) copolymer ------ | 1.5–15 |
| 2,4-toluene diisocyanate/trimethylolpropane (about 3/1), crosslinking (hardening) agent ---------- | 0.2–5.0 |
| Lubricant(s) ---------- | 0.1–2.0 |

Formulation D:

| | |
|---|---|
| Ferromagnetic chromium oxide ---- [1 2] | About 73–85 |
| Preformed butyl methacrylate/butyl acrylate copolymer (about 50/50) ---------- | 10–25 |
| Butyl methacrylate/2-methyl-5-vinylpyridine (90/10 to 80/20) copolymer ---------- | 1.5–15 |
| 2,4-toluene diisocyanate/trimethylolpropane (about 3/1), crosslinking (hardening) agent ---------- | 0.2–5.0 |
| Lubricant(s) ---------- | 0.1–2.0 |

[1] The weight percent of ferromagnetic chromium oxide varies depending on the overall density of the composite binder as the proportions of this binder constituents are changed.
[2] About 35–55% by volume.

SPECIFIC EMBODIMENTS OF THE INVENTION

The magnetic recording members of this invention are described in further detail in the following non-limiting examples.

In these examples, and throughout the specification, quantities are expressed as volume percent and/or as weight percent. The use of volume percent permits compensation for the differences in density as the components of the recording members are changed and the volume percent of the ferromagnetic chromium oxide e.g., chromium dioxide, is held constant. Density is assumed to be that of the individual components in their normal physical state at room temperature. The magnetic oxide content of the recording members can range from 1 to 98% by weight, but desirably ranges from about 35 to 55% by volume, i.e., from about 65 to 85% by weight. In many of the examples, ferromagnetic chromium oxide content is maintained constant at 41 volume percent, and the quantities of other components of the recording members are adjusted as desired, maintaining this same volume relationship.

In all of the examples, the ferromagnetic chromium oxides employed were various samples of chromium dioxide prepared as described in Cox, U.S. Pat. 3,278,263. The samples are further characterized by their more important magnetic properties, viz, intrinsic coercive force, saturation per gram, and retentivity or remanence per gram. Intrinsic coercive force $_IH_C$, is defined in Special Technical Publication No. 8 of the American Society for Testing Materials entitled "Symposium on Magnetic Testing" (1948), pp. 191–198. The values given herein were determined on a DC ballistic-type apparatus which is a modified form of the apparatus described by Davis and Hartenheim in "Review of Scientific Instruments." 7, 147 (1936). Saturation per gram, $\sigma_s$, and retentivity or remanence per gram, $\sigma_r$, are defined on pp. 5–8 of Bozorth's "Ferromagnetism," D. Van Nostrand Co., New York (1951). The values given for these properties were determined in a field of 4400 oersteds on apparatus similar to that described by T. R. Bardell on pp. 226–228 of "Magnetic Materials in the Electrical Industry," Philosophical Library, New York (1955). Values for the magnetic properties of the ferromagnetic chromium oxide samples used were $_IH_C=405\pm35$ oersteds, $\sigma_s=82.3\pm4.0$ gauss-cm.$^3$/g., $\sigma_r=37.5\pm1.1$ gauss-cm.$^3$/g., $\sigma_r/\sigma_s=0.455\pm0.015$.

Examples 1–66 and 102–112 demonstrate the use of tertiary amine-containing polymers with commercial binder materials such as the polyester-polyurethane and vinylidene chloride/acrylonitrile copolymer types. The other examples show, as the remainder of the organic binder, conventional acrylate polymers such as those disclosed generically and also specifically, i.e., poly(methyl methacrylate), by the Nacci Belgian Patents 672,017 (Examples I and IV) and 672,018 (Examples VII, VIII and IX).

EXAMPLE 1

A glass jar of about 60 ml. capacity is charged with 0.5 g. of a copolymer of 90% by weight of methyl methacrylate and 10% of 2-methyl-5-vinylpyridine, 29.6 ml. of tetrahydrofuran, 10 g. of a ferromagnetic chromium oxide, in this instance chromium dioxide, having an intrinsic coercive force, $_IH_C$, of 382 oersteds, a $\sigma_r$ of 37.4 gauss-cm.$^3$/g., and a $\sigma_s$ value of 82.0 gauss-cm.$^3$/g., and 30 ml. of 20–30 mesh Ottawa sand. The jar is capped and the ingredients are slurry-milled for 1 hour by shaking the jar in a commercial paint conditioning machine operating at about 1000 cycles/minute. The contents of the jar are transferred to another glass jar of about 120 ml. volume, together with 11.3 g. of a 15% by weight solution of a soluble polyester-polyurethane resin, i.e., a diphenylmethane diisocyanate/adipic acid/2–4 carbon alkanediol resin in tetrahydrofuran, and 5.6 g. of a 30% by weight solution of a vinylidene chloride/acrylonitrile (80/20) copolymer in methyl isobutyl ketone. The jar and its contents are shaken for another 30 minutes on the paint conditioner, after which the contents are pressure-filtered through a cloth pad supported on a metal screen (known commercially as "Rigimesh") having a 2-micron filter rating. The viscosity of the filtrate is adjusted, if necessary, to about 7 poises by diluting with tetrahydrofuran. The dispersion is ready for coating on a film for the preparation of magnetic recording tape.

A dispersion prepared as described above is spread by means of a doctor knife set at a 3-mil clearance on an uncoated 1.5-mil poly(ethylene terephthalate) film (40" x 3.25") smoothly supported on a glass plate. The wet film is promptly passed between opposing magnets having an orienting magnetic field of about 900 gauss to align the chromium oxide particles, and the oriented film is then dried under a cover glass overnight at room temperature. The dry tapes are then evaluated for magnetic properties and aged at the desired temperatures and humidities. Tapes to be tested for output and smoothness are first calendered at approximately 110° C. and 1100 p.l.i. (pounds per linear inch) prior to aging. The results of the tests on the tape of this example are recorded in Table B below.

Examples 2–22

Table B also includes the results of tests on other tapes made in a manner similar to that described in Example 1 but with the indicated amount of the same or different methyl methacrylate/methylvinylpyridine copolymer or other methylvinylpyridine-containing polymers substituted for the 3.4% methyl methacrylate/2 - methyl - 5 - vinylpyridine (90/10) copolymer of Example I. In Table B and following tables, the proportions of various comonomers are expressed as the percent by weight of the comonomers used to prepare the copolymers. In Examples 16–18, inclusive, the proportions of the preformed polyester-polyurethane resin and vinylidene chloride/acrylonitrile copolymer used as binders in the compositions are 40/60 instead of 50/50 as used in Examples 1–15 and 19–22, inclusive, and in the controls. Table B also includes the results of tests of two control tapes with the tertiary amine-containing copolymer omitted but with conventional dispersing agents included and one control with no dispersing agent used. The particular dispersing agents used in these controls are soya lecithin and a fatty alcohol amine sulfate.

These examples show that increasing stability usually results from the use of increasing amounts of tertiary amine-containing copolymers and from the use of copolymers containing increasing amounts of the tertiary amine-containing component. These examples also show that the tertiary amine-containing copolymer acts as a dispersing agent as well as a stabilizer, and that the lower molecular weight polymers tend to give better dispersing action with comparable stabilizing action. Example 9 shows that the good stabilizing action of the tertiary amine-containing copolymer carries over to magnetic tapes made on a continuous pilot-scale coating machine.

In Examples 23–30 and in the controls, the proportions of ester-urethane resin and $VCl_2$/AN binders are as in Example 1, i.e., 50/50, but in Examples 31–32, inclusive, the proportions of these two binders are 40–60.

TABLE B.—STABILIZATION OF CHROMIUM OXIDE-CONTAINING MAGNETIC TAPES WITH 2-METHYL-5-VINYLPYRIDINE COPOLYMERS

[$CrO_2$=41%, by volume, of solids; Binder=50/50 (E-U)/($VCl_2$/AN) in Examples 1–15 and 19–20; 40/60 in Examples 16–18]

| | Tertiary amine-containing polymers | | | Tape properties | | |
|---|---|---|---|---|---|---|
| Example No. | Comonomers (proportion) | Inherent viscosity | Wt. percent based on $CrO_2$ | iHc oersteds | P/W | Stability, $t_{16}$ at 65° C./50% RH |
| 1 | MMA/MVP (90/10) | 0.15 | 5.0 | 370 | 21.2 | 26.3 |
| 2 | do | 0.27 | 3.6 | 368 | 22.3 | 19.5 |
| 3 | do | 0.27 | 7.2 | 371 | 24.6 | >20($t_9$=20) |
| 4 | MMA/MVP (98/2) | 0.31 | 3.4 | 368 | 17.7 | 9.1 |
| 5 | MMA/MVP (80/20) | 0.14 | 5.0 | 364 | 23.4 | 19.2 |
| 6 | MMA/MVP (50/50) | 0.29 | 3.4 | 360 | 18.0 | 17.0 |
| 7 | MMA/MVP (15/85) | 0.08 | 5.0 | 364 | 16.7 | 9.8 |
| 8 | MMA/MVP (90/10) | 2.54 | 5.0 | 382 | 9.8 | 19.6 |
| 9 [1] | do | 0.24 | 6.0 | 364 | 31.7 | 25.0 |
| 10 | MMA/MVP (90/10) [2] | | 5.0 | 372 | 29.5 | 19.2 |
| 11 | MA/MVP (90/10) | 0.49 | 5.0 | 354 | 24.6 | 14.6 |
| 12 | MA/MVP (50/50) | | 5.0 | 370 | 17.9 | 16.6 |
| 13 | BMA/MVP (80/20) | 0.28 | 5.0 | 355 | 30.7 | 10.2 |
| 14 | BA/MVP (80/20) | | 5.0 | 365 | 26.6 | 10.6 |
| 15 | LMA/MVP (80/20) | | 5.0 | 370 | 28.1 | 8.8 |
| 16 | 2-VP/MVP (50/50) | | 4.0 | 364 | 16.1 | 7.5 |
| 17 | SMA/MVP (95/5) | | 4.0 | 354 | 24.6 | 5.8 |
| 18 [3] | Styrene/MVP (50/50) | | 4.0 | 364 | 38.3 | 36.0 |
| 19 | MMA/BA/MVP (42/42/16) | | 5.0 | 370 | 26.1 | 17.7 |
| 20 | MMA/HEMA/MVP (85/5/10) | | 5.0 | 370 | 22.7 | 22.7 |
| 21 | MA/HEMA/MVP (73/8/19) | | 5.0 | 370 | 23.0 | 21.3 |
| 22 | BA/HEMA/MVP (73/8/19) | | 5.0 | 370 | 27.9 | 13.8 |
| Control A | Soya lecithin | | 5.0 | 370 | 26.8 | 1.8 |
| Control B | Fatty alcohol amine sulfate | | 5.0 | 370 | 21.0 | 3.7 |
| Control C | No dispersant | | | 360 | 17.8 | 4.5 |

[1] In this particular tape the composition of Example 3 is coated on the poly(ethylene terephthalate) base film by a continuous pilot coater.
[2] Plus XL–1, 5.8 wt. percent of binder plus stearamide, 1.0 wt. percent of binder.
[3] The vinylidene chloride/acrylonitrile binder in this tape also contains some methyl methacrylate.

NOTE—Abbreviations: MMA=Methyl methacrylate; MA=Methyl acrylate; BMA=Butyl methacrylate; BA=Butyl acrylate; LMA=Lauryl methacrylate; SMA=Stearyl methacrylate; MVP=2-methyl-5-vinylpyridine; 2-VP=2-vinylpyridine; XL-1=2,4-toluenediisocyanate/trimethylolpropane (3/1); E-U=Preformed polyester-polyurethane resin as defined earlier; $VCl_2$/AN=Vinylidene chloride/acrylonitrile (80/20) copolymer; HEMA=Hydroxyethyl methacrylate.

Examples 23–32

The procedure of Example 1 is repeated with the particular vinylpyridine-containing polymers indicated below in Table C substituted in the indicated quantities for the 2-methyl-5-vinylpyridine copolymer of that example.

The results of the tests on the magnetic recording tapes produced in the same manner as described in Example 1 are also summarized in Table C. These examples also show that increased stability is often produced by use of polymers with larger proportions of the tertiary amine moiety of the polymer.

TABLE C.—STABILIZATION OF CHROMIUM OXIDE-CONTAINING MAGNETIC TAPES WITH 2-VINYL- AND 4-VINYLPYRIDINE COPOLYMERS

[$CrO_2$=41%, by volume, of solids; Binder=50/50 (E-U)/($VCl_2$/AN) in Examples 23–30; 40/60 in Examples 31–32

| | Tertiary amine-containing polymers | | Tape properties | | |
|---|---|---|---|---|---|
| Example No. | Comonomers (proportions) | Amount, wt. percent of $CrO_2$ | iHc oersteds | P/W | Stability, $t_{10}$ at 65° C./50% RH |
| 23 | MMA/2-VP (98/2) | 3.4 | 360 | 15.0 | 9.5 |
| 24 | MMA/2-VP (95/5) | 3.4 | 364 | 18.4 | 10.7 |
| 25 | MMA/2-VP (90/10) | 3.4 | 364 | 16.3 | 13.0 |
| 26 | MMA/2-VP (80/20) | 3.4 | 368 | 16.6 | 12.7 |
| 27 | MMA/2-VP (50/50) | 3.4 | 360 | 17.7 | 26.0 |
| 28 | MMA/4-VP (90/10) | 5.0 | 372 | 16.7 | 14.3 |
| 29 | MMA/4-VP (80/20) | 5.0 | 365 | 17.3 | 14.8 |
| 30 | MMA/4-VP (50/50) | 5.0 | 365 | 14.7 | 12.8 |
| 31 | BMA/2-VP (95/5) | 4.0 | 354 | 24.6 | 6.9 |
| 32 | $VCl_2$/AN/2-VP[1] | 4.0 | 354 | 27.4 | 15.0 |
| Control D | Soya lecithin | 4.0 | 360 | 34.7 | 3.0 |
| Control E | Fatty alcohol amine sulfate | 3.3 | 364 | 25.4 | 3.2 |

[1] Exact proportions of comonomers not known.

NOTE—Abbreviations: MMA=Methyl methacrylate; BMA=Butyl methacrylate; 2-VP=2-vinylpyridine; 4-VP=4-vinylpyridine; $VCl_2$=Vinylidene chloride; AN=Acrylonitrile; E-U=Preformed polyester-polyurethane resin as defined earlier; $VCl_2$/AN=Vinylidene chloride/acrylonitrile (80/20) copolymer.

Examples 33–37

The procedure of Example 1 is repeated with dialkylaminoethyl methacrylate copolymers substituted for the 2-methyl-5-vinylpyridine copolymer of that example in the amounts indicated in the following Table D. The results of the tests on the magnetic recording tapes produced in these examples are summarized also in Table D. These examples show that an increase in stabilization occurs with the use of increasing proportions of another tertiary amine-containing copolymer.

TABLE D.—STABILIZATION OF CHROMIUM OXIDE-CONTAINING MAGNETIC TAPES WITH DIALKYLAMINOETHYL METHACRYLATE COPOLYMERS

[$CrO_2$=41%, by volume, of solids; Binder=50/50 (E-U)/($VCl_2$/AN)]

| | Tertiary amine-containing polymers | | Tape properties | | |
|---|---|---|---|---|---|
| Example No. | Comonomers (proportions) | Amount, wt. percent of $CrO_2$ | $_IH_C$, oersteds | P/W | Stability, $t_{10}$ at 65° C./50% RH |
| 33 | BMA/DEAM (98/2) | 3.6 | 371 | 27.3 | 8.2 |
| 34 | MMA/DEAM (90/10) | 5.0 | 370 | 21.4 | 13.2 |
| 35 | MMA/DEAM (80/20) | 5.0 | 370 | 18.2 | 19.4 |
| 36 | do | 5.0 | 370 | 19.5 | 14.1 |
| 37 | MMA/DMAM (90/10) | 5.0 | 370 | 21.0 | 14.2 |
| Control D | Soya lecithin | 4.0 | 360 | 34.7 | 3.0 |
| Control E | Fatty alcohol amine sulfate | 3.3 | 364 | 25.4 | 3.2 |
| Control F | MMA/MVP (90/10) | 3.6 | 368 | 22.3 | 19.5 |

NOTE.—Abbreviations: BMA=Butyl methacrylate; DEAM=Diethylaminoethyl methacrylate; DMAM=Dimethylaminoethyl methacrylate; MMA=Methyl methacrylate; MVP=2-methyl-5-vinylpyridine; E-U=Preformed polyester-polyurethane resin as defined earlier; $VCl_2$/AN=Vinylidene chloride/acrylonitrile (80/20) copolymer.

Examples 38–40

The procedure of Example 1 is repeated with the particular tertiary amine-containing homopolymers in the proportions listed in Table E, substituted for the 2-methyl-5-vinylpyridine copolymers used in that example. The results of the tests on the magnetic recording tapes obtained are summarized also in Table E. These examples show that homopolymers of tertiary amine-containing monomers act as stabilizers, but they are less effective than copolymers of the same tertiary amine-containing monomers with methyl methacrylate.

Especially high quality magnetic recording members are prepared by slight modifications of the procedure of Example 1. These are described in Examples 41 and 42.

TABLE E.—STABILIZATION OF CHROMIUM OXIDE-CONTAINING MAGNETIC TAPES WITH TERTIARY AMINE-CONTAINING HOMOPOLYMERS

[$CrO_2$=41%, by volume, of solids; Binder=50/50 (E-U)/($VCl_2$/AN)]

| | Tertiary amine-containing polymers | | Tape properties | | |
|---|---|---|---|---|---|
| Example No. | Homopolymer | Amount, wt. percent of $CrO_2$ | $_IH_C$, oersteds | P/W | Stability, $t_{10}$ at 65° C./50% RH |
| 38 | Poly(MVP) | 4.0 | 354 | 11.9 | 8.2 |
| 39 | Poly(2-VP) | 4.0 | 364 | 10.8 | 8.6 |
| 40 | Poly(4-VP) | [1] 3.4 | 354 | 18.4 | ~7-9 |
| Control D | Soya lecithin | 4.0 | 360 | 34.7 | 3.0 |
| Control E | Fatty alcohol amine sulfate | 3.3 | 364 | 25.4 | 3.2 |

[1] Polymer not completely soluble in binder sysem.

NOTE.—Abbreviations: MVP=2-methyl-5-vinylpyridine; 2-VP=2-vinylpyridine; 4-VP=4-vinylpyridine; E-U=Preformed polyester-polyurethane resin as defined earlier; $VCl_2$/AN=Vinylidene chloride/acrylonitrile (80/20) copolymer.

Example 41

A 10-g. sample of ferromagnetic chromium oxide having an intrinsic coercive force, $_IH_C$, of 438 oersteds, a $\sigma_s$ of 82.6 gauss-cm.$^2$/g., and a $\sigma_r$ of 38 gauss-cm.$^2$/g. is added slowly with stirring under a nitrogen atmosphere to a solution of 0.70 g. of a methyl acrylate/2-methyl-5-vinylpyridine (84/16) copolymer in 1.375 g. of methyl isobutyl ketone and 26.6 g. of tetrahydrofuran (THF). An equal volume of 20–30 mesh Ottawa sand is added and the dispersion is stirred with a disk stirrer at 1200 peripheral ft./min. for 30 minutes, THF being added as necessary to maintain viscosity. To the resulting dispersion there are added: 0.04 g. of stearamide; 1.20 g. of a 10% solution of a polyisocyanate made from 2,4-toluene diisocyanate/trimethylolpropane (3/1) in tetrahydrofuran; and 17.86 g. of a 15% solution of a soluble diphenylmethane diisocyanate/adipic acid/butanediol resin in THF. After being stirred for another 30 minutes at 1200 peripheral ft./min., the dispersion is filtered under pressure through a screen having a 5-micron rating. The filtered dispersion has a viscosity of 7.2 poises, $B_r/B_s$ the coating compositions amounts to 41% of the total volume of solids. These examples show that tertiary TABLE F.—STABILIZATION OF CHROMIUM OXIDE-CONTAINING MAGNETIC TAPES WITH TERTIARY AMINE-CONTAINING COPOLYMERS AS BINDER-STABILIZERS

[$CrO_2$=41%, by volume, of total solids]

| | Binder composition | | | Tape properties | | |
|---|---|---|---|---|---|---|
| Example No. | Polymers | Ratio of E-U or E-U plus $VCl_2$/AN to basic polymer | Basic polymer, wt. percent of $CrO_2$ | $_IH_C$, oersteds | $P/W$ | Stability, $t_{10}$ at 65° C./50% RH |
| 43 | E-U plus MMA/MVP (90/10) | 9.4:1 | 3.3 | 364 | 23.0 | 12.6 |
| 44 | do | 4.7:1 | 6.6 | 355 | 26.6 | 20.4 |
| 45 | do | 1.2:1 | 14.6 | 364 | 19.6 | 37.0 |
| 46 | E-U plus MMA/MVP (90/10) (plus XL-1, 8.1 wt. percent of binder plus stearamide, 0.9 wt. percent of binder). | 1.2:1 | 14.6 | 364 | 23.7 | 16.6 |
| 47 | E-U plus MMA/MVP (90/10) (plus DC 200, 1.0 wt. percent of $CrO_2$) | 1:1 | 16.2 | 372 | 26.4 | 32.5 |
| 48 | E-U plus MMA/MVP (95/5) | 1:1 | 16.2 | 361 | 21.9 | 21.3 |
| 49 | E-U plus MMA/MVP (80/20) | 1:1 | 16.2 | 357 | 20.4 | 21.2 |
| 50 | E-U plus MMA/MVP (50/50) | 1:1 | 16.2 | 357 | 23.3 | 21.0 |
| 51 | E-U plus MMA/MVP (15/85) | 1:1 | 16.2 | 365 | 17.9 | 14.1 |
| 52 | E-U plus MMA/2-VP (95/5) | 1:1 | 16.2 | 361 | 22.0 | 20.2 |
| 53 | E-U plus MMA/2-VP (80/20) | 1:1 | 16.2 | 364 | 25.4 | 21.5 |
| 54 | E-U plus MMA/2-VP (50/50) | 1:1 | 16.2 | 361 | 23.9 | 33.8 |
| 55 | E-U plus MMA/4-VP (90/10) | 1:1 | 16.2 | 360 | 25.0 | 18.2 |
| 56 | E-U plus MMA/4-VP (50/50) | 1:1 | 16.2 | 355 | 16.9 | 13.3 |
| 57 | E-U plus BMA/MVP (80/20) | 1:1 | 16.2 | 368 | 35.0 | 17.5 |
| 58 | E-U plus BMA/MVP (80/20) (plus stearamide, 0.3 wt. percent of oxide) | 1:1 | 16.2 | 372 | 29.5 | 17.3 |
| 59 | E-U plus MMA/DEAM (90/10) | 1:1 | 16.2 | 375 | 33.5 | 14.5 |
| 60 | E-U plus MMA/DEAM (80/20) (plus XL-1, 2.2 wt. percent of oxide) | 1:1 | 16.2 | 400 | 12.4 | 11.6 |
| 61 | E-U plus MMA/MVP/HEMA (85/10/5) | 1:1 | 16.2 | 382 | 30.2 | 20.8 |
| 62 | 50/50 (E-U)/($VCl_2$/AN) plus MMA/DMAEVE (94/6) | 6.7:1 | 5.0 | 370 | 21.8 | 19.0 |
| 63 | 50/50 (E-U)/($VCl_2$/AN) plus MMA/1-VIm (94/6) | 6.7:1 | 5.0 | 372 | 17.8 | 15.4 |
| Control G | E-U plus soya lecithin | 9.4:1 | ---------- | 364 | 33.8 | 2.2 |

NOTE.—Abbreviations: E-U=preformed polyester-polyurethane resin as defined earlier; $VCl_2$/AN=vinylidene chloride/acrylonitrile (80/20 copolymer; MMA=methyl methacrylate; BMA=butyl methacrylate; HEMA=hydroxyethyl methacrylate; DC 200=Dow Corning silicone oil (100 centistokes); DEAM=diethylaminoethyl methacrylate; DMAEVE=dimethylaminoethyl vinyl ether; MVP=2-methyl-5-vinylpyridine; 2-VP=2-vinylpyridine; 4-VP=4-vinylpyridine; XL-1=2,4-toluenediisocyanate/trimethylolpropane (3/1); 1-VIm=1-vinylimidazole.

of 0.89 and a $P/W$ of 29.2. The ratio $B_r/B_s$ is the fraction of magnetic flux density remaining after the saturating field has been reduced to zero.

The above dispersion is spread under a 3-mil doctor knife on a 1.5-mil poly(ethylene terephthalate) film base. While the coating is still fluid, the film is passed between opposing magnets having a magnetic field of about 900 gauss, to align the chromium oxide particles, and then air-dried. The dry film is calendered twice at 110° C./1100 p.l.i. The calendered tape is cured at 55° C. for 2 days. The resultant glossy tape has very good wear resistance; it has a gross wear of 0.4 $\mu''$/min. compared to the 1.0 $\mu''$/min. gross wear of a commercial standard heavy duty tape. This tape also has a good frequency responsive and a low noise (AC and DC), good stability ($\phi_r t_{10}$ of 10.6 days at 65° C./50% RH), and a low friction ($\mu$=0.27 against brass in a standard friction test).

Example 42

The formulation and procedure described in Example 41 are used with the exception that the toluene diisocyanate/trimethylolpropane resin is replaced by 0.12 g. of 4,4' - methylenebis(cyclohexylisocyanate) as crosslinking (hardening) agent. The calendered tape is cured at 65° C. for 22 hours. The resultant tape is smooth and well adhered. It has a gross wear of 0.8 $\mu''$/min., and an excellent frequency response, low AC noise, and a $\phi_r t_{10}$ of 7.3 days at 65° C./50% RH.

Examples 45–63

In these examples, the procedure of Example 1 is modified to omit in some cases the vinylidene chloride/acrylonitrile copolymer from the binder composition and to use the particular tertiary amine-containing copolymers in the proportions listed in Table F. As in the previous example, the proportion of chromium oxide particles in the coating compositions amounts to 41% of the total volume of solids. These examples show that tertiary amine-containing copolymers are effective as stabilizers and binders in compositions containing polyester-polyurethane binder only, as well as in compositions containing mixtures of this binder with vinylidene chloride/acrylonitrile copolymer.

While the tertiary amine-containing polymers of Examples 1–63 are a known class of materials, their preparations are given in the following Table G. The preparations of the polymers are referred to as "runs" to distinguish them from the examples themselves.

The polymers of runs 1–7, 9–37, and 41–63 were prepared by solution polymerization, that of run 8 by emulsion polymerization, those of runs 38 and 39 formed spontaneously in the monomer at room temperature, and that of run 40 was obtained commercially. Benzene was used as the solvent in runs 1–7, 9–11, 13–29, 34–37, 47–55, and 57–63; water with 4.0 g. of sodium lauryl sulfate dispersing agent in run 8; methyl isobutyl ketone in runs 12, 41 and 42; and toluene in runs 30 and 56. Vazo® vinyl polymerization catalyst ($\alpha,\alpha'$-azodiisobutyronitrile) was used as initiator in all instances.

Monomers used in runs 2–4, 6, 16–18, 23–27, 31–33, 43–46, 48–50, 52–54, and 64–66, in the proportions to give the specified nominal composition, and Vazo® initiator were dissolved in benzene in a nitrogen atmosphere. In these runs the total monomer charge was approximately 40 weight percent of the solution, and the quantity of Vazo® was 0.5–1% of the total weight of the monomer. The solutions were distributed among soda-type pressure bottles which were capped and tumbled in a water-bath at 80° C. for about 16 hours. The bottles were cooled and the contents were combined and used without purification. Isolation of the polymer was conventional.

Inherent viscosity was measured at 0.5 w./v. percent concentration in chloroform at 25° C.

TABLE G.—SYNTHESIS OF TERTIARY AMINE-CONTAINING POLYMERS USED IN EXAMPLES 1-63

| Run No. | Nominal composition of basic polymer | Monomers charged, grams [a, b] | Conditions: Initial, g. [c] | Conditions: t, ° C. | Conditions: Hours | Inherent viscosity |
|---|---|---|---|---|---|---|
| 1 | MMA/MVP (90/10) | MMA 360, MVP 20 plus 15 | 8 | 80 | 2 | 0.15 |
| 5 | MMA/MVP (80/20) | MMA 360, MVP 40 plus 30 | 16 | 85 | 1.5 | 0.14 |
| 7 | MMA/MVP (15/85) | MMA 30, MVP 170 | 12 | 80 | 2.5 | 0.08 |
| 8 | MMA/MVP (90/10) | MMA 68, MVP 7.5 | [f] 0.75 | 57-89 | 2 | 2.54 |
| 9 | MMA/MVP (90/10) | MMA 360, MVP 20 plus 15 | 2.0+.25+.25 | 80 | 3 | 0.24 |
| 10 | MMA/MVP (90/10) | MMA 2250, MVP 125 + 94 | 50 | 75-80 | 2.5 | 0.14 |
| 11 | MA/MVP (90/10) | MA 310, MVP 12 plus 28 | 2.0 | 80 | 2.5 | 0.49 |
| 12 | MA/MVP (50/50) | MA 100, MVP 100 | 3.0+1.0+1.0 | 80 | 31 | 0.17 |
| 13 | BMA/MVP (80/20) | BMA 400, MVP 30 plus 65 | 2.0+1.0 | 80-81 | 24.5 | 0.28 |
| 14 | BA/MVP (80/20) | BA 200, MVP 12 plus 36 | 4.0 | 79-82 | 3.5 | 0.21 |
| 15 | LMA/MVP (80/20) | LMA 200, MVP 15 plus 33 | 4.0 | 80-81.5 | 3.5 | 0.15 |
| 19 | MMA/BA/MVP (42/42/16) | MMA 93, BA 93, MVP 9.6 plus 26 | 4.0 | 80 | 6 | 0.15 |
| 20 | MMA/HEMA/MVP (85/5/10) | MMA 170, HEMA 10, MVP 10 plus 8.4. | 4.0 | 80 | 2.75 | ---- |
| 21 | MA/HEMA/MVP (73/8/19) | MA 180, HEMA 20, MVP 12 plus 36 | 4.0 | 80 | 3.5 | 0.28 |
| 22 | BA/HEMA/MVP (73/8/19) | BA 179, HEMA 20, MVP 12 plus 36 | 4.0 | 80 | 3.5 | ---- |
| 28 | MMA/4-VP (90/10) | MMA 190, 4-VP 10 plus 8.5 | 4.0 | 80 | 2 | 0.17 |
| 29 | MMA/4-VP (80/20) | MMA 180, 4-VP 25 plus 19 | 4.0 | 80 | 2 | 0.17 |
| 30 | MMA/4-VP (50/50) | MMA 75, 4-VP 89 | 20.0 | [d] 98-100 | 1.75 | 0.08 |
| 34 | MMA/DEAM (90/10) | MMA 180, DEAM 20 | 4.0 | 80 | 1.5 | 0.12 |
| 35 | MMA/DEAM (80/20) | MMA 160, DEAM 40 | 4.0 | 80 | 1.5 | 0.10 |
| 36 | MMA/DEAM (80/20) | MMA 160, DEAM 40 | 4.0 | 80 | 1.5 | 0.10 |
| 37 | MMA/DMAM (90/10) | MMA 180, DMAM 20 | 4.0 | 80 | 1.5 | 0.19 |
| 38 | Poly(MVP) | 100% MVP | | | | |
| 39 | Poly(2-VP) | 100% 2-VP | | | | |
| 40 | Poly(4-VP) | 100% 4-VP | | | | |
| 41 | MA/MVP (84/16) | MA 930, MVP 48 plus 130 | 15+5 | 80 | 23 | 0.23 |
| 42 | MA/MVP (84/16) | MA 930, MVP 48 plus 130 | 15+5 | 80 | 23 | 0.23 |
| 47 | MMA/MVP (90/10) | MMA 7,200 ml., MVP 375 plus 282 | 150 | 79-82 | 3.5 | 0.10 |
| 51 | MMA/MVP (15/85) | MMA 30, MVP 170 | 12 | 80 | 2.5 | 0.08 |
| 55 | MMA/4-VP (90/10) | MMA 190, 4-VP 10 plus 8.5 | 4.0 | 80 | 2 | 0.17 |
| 56 | MMA/4-VP (50/50) | MMA 75, 4-VP 89 | 20 | 98-100 | 1.75 | 0.08 |
| 57 | BMA/MVP (80/20) | BMA 400, MVP 30 plus 65 | 8.0 | 80 | 5 | 0.17 |
| 58 | BMA/MVP (80/20) | BMA 400, MVP 30 plus 65 | 8.0 | 80 | 5 | 0.17 |
| 59 | MMA/DEAM (90/10) | MMA 180, DEAM 20 | 4.0 | 80 | 1.5 | 0.12 |
| 60 | MMA/DEAM (80/20) | MMA 160, DEAM 40 | 4.0 | 80 | 1.5 | 0.10 |
| 61 | MMA/MVP/HEMA (85/10/5) | MMA 170, MVP 10 plus 8.4, HEMA 10. | 4.0 | 80 | 2.75 | ---- |
| 62 | MMA/DMAEVE (94/6 [b] | MMA 40, DMAEVE [g] 10 | 0.75 | 80-82 | 5 | 0.70 |
| 63 | MMA/1-VIm (94/6 [b] | MMA [e] 18, 1-VIm [g] 2.0 | 0.40 | 76-82 | 17 | 0.17 |

[a] MMA=methyl methacrylate; MA=methyl acrylate; MVP=2-methyl-5-vinylpyridine; BA=butyl acrylate;B MA=butyl methacrylate; 4-VP=4-vinylpyridine; LMA=lauryl methacrylate; SMA=stearylmethacrylate; HEMA=2-hydroxyethyl methacrylate; S=Styrene; DEAM=2-(diethylamino[b]ethyl methacrylate; DMAM=2-(dimethylamino)ethyl methacrylate; DMAEVE=2-(dimethylamino)ethyl vinyl ether; 1-VIm=1-vinylimidazole; 2-VP=2-vinylpyridine.

[b] Where more than one amount is shown for a given monomer, the first quantity was added initially to the reaction mixture and the second amount was added gradually during the polymerization.

[c] Quantities after the first one shown were added later during polymerization reaction.

[d] Solution of monomers and initiators in toluene added dropwise during 1.5 hours to stirred toluene maintained on a steam bath at 98-100°C., then continued heating for an additional 15 minutes.

[e] Distilled monomer.

[f] Vazo R was dissolved in 8 ml. of ethyl acetate and the solution added to the polymerization mixture.

[g] Purchased from Monomer-Polymer Laboratories.

Examples 64–66

As indicated previously, mixtures of tertiary amine-containing polymers with conventional dispersing agents are beneficial to the stability of the magnetic tape. The effects of combinations of dispersing agents with two different binder systems in chromium oxide-containing tapes are illustrated in Examples 64–66.

Coated tapes are prepared by the procedure described in Example 1 with the exception that vinylidene chloride/acrylonitrile copolymer alone and polyester-polyurethane resin alone are substituted for the 50/50 mixtures of these binders in that example, and a methyl methacrylate/2-methyl-5-vinylpyridine (90/10) copolymer alone or mixed in equal volumes with soya lecithin is the dispersing agent. The total volume of dispersing agents used is 16% of the volume of the $CrO_2$ used (which corresponds to 3.3–4.0 weight percent of the $CrO_2$, depending on the density of the particular dispersing agent). The results of the tests of the tapes from these examples, together with results of tests on control tapes containing no tertiary amine-containing polymer, are summarized in Table H.

TABLE H.—STABILIZATION OF CHROMIUM OXIDE-CONTAINING MAGNETIC TAPES WITH TERTIARY AMINE-CONTAINING COPOLYMERS AS DISPERSANTS

[$CrO_2$=41%, by volume, of total solids]

| Example No. | Binder | Dispersing agents | Percent of $CrO_2$ by vol. | Tape properties: IHC, oersteds | Tape properties: P/W | Tape properties: Stability, $t_{10}$ at 65° C./50% RH |
|---|---|---|---|---|---|---|
| 64 | $VCl_2$/AN | MMA/MVP (90/10) | 16.0 | 371 | 22.7 | 64.5 |
| 65 | $VCl_2$/AN | (Soya lecithin)<br>(MMA/MVP [90/10]) | 8.0<br>8.0 | 368 | 32.3 | 9.5 |
| Control H | $VCl_2$/AN | Soya lecithin | 16.0 | 364 | 37.6 | 2.7 |
| 43 | E-U | MMA/MVP (90/10) | 16.0 | 364 | 23.0 | 12.6 |
| 66 | E-U | (Soya lecithin)<br>(MMA/MVP [90/10]) | 8.0<br>8.0 | 364 | 25.9 | 4.7 |
| Control G | E-U | Soya lecithin | 16.0 | 364 | 33.8 | 2.2 |

NOTE.—Abbreviations: $VCl_2$/AN=Vinylidene chloride/acrylonitrile (80/20) copolymer; E-U=Preformed polyester-polyurethane resin as defined earlier; MMA=Methyl methacrylate; MVP=2-methyl-5-vinylpyridine.

Examples 67–81

The procedure of Examples 67–81 is quite similar to that of Example 1, differing most notably in the solvent employed and in the substitution of preformed acrylate and acrylate-containing polymers for polyester-polyurethane resin and vinylidene chloride/acrylonitrile copolymer.

TABLE I.—CHROMIUM OXIDE-CONTAINING MAGNETIC TAPES WITH, AS BINDERS, COMBINATIONS OF PREFORMED ACRYLATE-CONTAINING POLYMERS AND TERTIARY AMINE-CONTAINING COPOLYMERS

[$CrO_2$=41%, by volume, of total solids]

| | Preformed acrylate-containing polymer | | Polymeric tertiary amine-containing dispersant-stabilizer | | Tape properties | | |
|---|---|---|---|---|---|---|---|
| Example No. | Monomers (proportions by weight) | Inherent viscosity | Monomers (proportions by weight) | Weight percent based on $CrO_2$ | IHC, oersteds | P/W | Stability, $t_{10}$ at 65° C./50% RH |
| 67 | EA Homopolymer | 3.51 | BMA/MVP (80/20) | 6 | 365 | 24 | 13.0 |
| 68 | BA Homopolymer | 3.00 | do | 6 | 365 | 33 | 29.5 |
| 69 | BMA/BA (50/50) | 1.95 | do | 6 | 365 | 29 | 49.0 |
| 70 | do | 1.08 | do | 6 | 365 | 36 | 67.0 |
| 71 | BMA/BA/MVP (45/45/10) | 3.50 | do | 6 | 365 | 31 | 39.0 |
| 72 | MMA/BMA (50/50) | 0.75 | do | 6 | 355 | 39 | 70.0 |
| 73 | MMA/BA (50/50) | 1.43 | do | 6 | 360 | 33 | 72.7 |
| 74 | MMA/BA (25/75) | 2.64 | do | 6 | 370 | 16 | 48.0 |
| 75 | VAc/BA (50/50) | 2.84 | do | 6 | 370 | 14 | 42.5 |
| 76 | $VCl_2$/BA (75/25) | 0.75 | do | 6 | 370 | 36 | 37.5 |
| 77 | BMA/BA (50/50) | 2.26 | MMA/MVP (90/10) | 5 | 355 | 26 | 39.7 |
| 78 | do | 2.26 | MA/MVP (84/16) | 5 | 355 | 22 | 24.2 |
| 79 | do | 2.26 | BMA/HEMA/MVP (73/8/19) | 5 | 360 | 28 | 22.8 |
| 80 | do | 2.26 | MMA/BA/MVP (42/42/16) | 5 | 355 | 30 | 40.0 |
| 81 | do | 2.26 | BA/HEMA/MVP (73/8/19) | 5 | 355 | 31 | 21.0 |
| Control H | EA Homopolymer | 3.51 | None | None | 355 | 14 | 2.7 |
| Control I | BA Homopolymer | 3.00 | do | do | 365 | 13 | 6.0 |
| Control J | BMA/BA (50/50) | 1.95 | do | do | 365 | 15 | 13.0 |
| Control K | do | 1.08 | do | do | 360 | 16 | 13.4 |
| Control L | BMA/BA/MVP (45/45/10) | 3.50 | do | do | 370 | 9 | 37.5 |
| Control M | MMA/BMA (50/50) | 0.75 | do | do | 360 | 23 | 43.0 |
| Control N | MMA/BA (50/50) | 1.43 | do | do | 360 | 17 | 38.0 |
| Control O | MMA/BA (25/75) | 2.64 | do | do | 365 | 14 | 12.0 |
| Control P | VAc/BA (50/50) | 2.84 | do | do | 355 | 16 | 18.5 |
| Control Q | $VCl_2$/BA (75/25) | 0.75 | do | do | 345 | 13 | 35.0 |

NOTE.—Abbreviations: EA=Ethyl acrylate; BA=Butyl methacrylate; BMA=Butyl methacrylate; MVP=2-methyl-5-vinylpyridine; MMA=Methyl methacrylate; VAc=Vinyl acetate; $VCl_2$=Vinylidene chloride; HEMA=2-hydroxyethyl methacrylate.

A glass jar of about 60 ml. capacity is charged with 0.5–0.6 g. of the tertiary amine-containing dispersant-stabilizer specified in Table I, 25 ml. of benzene, 10 g. of ferromagnetic chromium oxide having an intrinsic coercive force, IHC, of 382 oersteds, a $\sigma_r$ of 37.4 gauss-cm.$^3$/g., and a $\sigma_s$ value of 82.0 gauss-cm.$^3$/g., and 30 ml. of 20–30 mesh Ottawa sand. The jar is capped and the ingredients are slurry-milled for 1 hour by shaking the jar in a commercial paint conditioning machine operating at about 1000 cycles/minute. The contents of the jar are transferred to another jar of about 120 ml. volume, and a solution of the preformed homo- or copolymer specified in Table I in 25 ml. of benzene is added. The jar and contents are shaken for about 30 minutes by the paint conditioner and the contents are pressure-filtered as described in Example 1. The undiluted dispersion is coated on a 1.5-mil poly(ethylene terephthalate) film base and tape properties are determined as described in Example 1. The results of tests of control tapes in which the polymeric tertiary amine-containing dispersant-stabilizer was not included in the formulation are given at the bottom of Table I. Though benzene was used as the solvent in Examples 67–81, other solvents, e.g., tetrahydrofuran, may also be employed.

It will be seen by comparing stability data in Table I with that of other examples that magnetic recording tapes in which the binder is a mixture of tertiary amine-containing polymeric material and preformed acrylate homopolymer or acrylate-containing copolymer are generally more stable than those in which the binder is a mixture of tertiary amine-containing polymeric material and polyester-polyurethane resin or vinylidene chloride/acrylonitrile copolymer blended with polyester-polyurethane resin. Control data at the bottom of Table I show that tertiary amine-containing polymeric dispersant-stabilizers contribute both to chromium oxide dispersibility and to the stability of the magnetic recording tape. In the absence of the basic dispersant-stabilizers, stability of acrylate and acrylate-containing polymeric binders is lower and variable, correlating roughly with the glass transition temperature of the polymers. Best overall performance in magnetic recording tapes is observed with rubbery or low glass transition temperature acrylate-containing preformed copolymers, e.g., 50/50 by weight poly(butyl methacrylate/butyl acrylate) and 25//75 by weight poly(methyl methacrylate/butyl acrylate).

Examples 82–101

In Examples 82–101, 10 g. of ferromagnetic chromium oxide (intrinsic coercive force, IHC, 435 oersteds; $\sigma_r$, 38.6 gauss-cm.$^3$/g.; $\sigma_s$, 82.1 gauss-cm.$^3$/g.), 20 ml. of tetrahydrofuran, the tertiary amine-containing dispersant-stabilizer shown in Table J, and 30 ml. of 20–30 mesh Ottawa sand are placed in a glass jar of about 60 ml. capacity and slurry-milled for 1 hour by shaking the jar in a commercial paint conditioning machine operating at about 1000 cycles/minute. The contents are transferred to another jar of about 120 ml. capacity containing a solution of the acrylate copolymer listed in the second column of Table J in 25 ml. of tetrahydrofuran, and the mixture is again shaken for 45 minutes by the paint conditioning machine. Additives, when shown in column 6, are added at this point—stearamide as a solid and 2,4-toluene-diisocyanate/trimethylolpropane (3/1) crosslinking (hardening) agent as a 10% by weight solution in tetrahydrofuran—and intimately mixed by shaking for an additional 15 minutes. The ensuing filtration, coating of the dispersion onto poly(ethylene terephthalate) film base, and evaluation, aging and testing of the tapes are carried out as described in Example 1. Tapes of similar characteristics may also be prepared using 50/50 by weight of tetrahydrofuran/methyl isobutyl ketone or methyl isobutyl ketone or benzene as solvents.

Data in Table J show that increasing the proportion of tertiary amine-containing dispersant-stabilizer in the binder usually enhances the stability of the tape. Stearamide, added to reduce the frictional characteristics of the finished tape, and the crosslinking (hardening) agent are somewhat deleterious to stability though the latter increases the adhesion of the coating to the base film. The high coercivity chromium oxide of Table J gives less stable tapes than the lower coercivity oxide of Table H. Optimum overall performance is obtained from formulations containing mixtures of copolymers of butyl methacrylate/butyl acrylate (50/50 by weight) with inherent viscosity, $\eta_{inh}$, of 1.5–2.5, with copolymers of methyl methacrylate/2-methyl-5-vinylpyridine (90/10) or butyl methacrylate/2-methyl-5-vinylpyridine (80/20)

as the tertiary amine-containing polymeric stabilizer-dispersant.

84–87. Initiators in the emulsion preparations were: potassium persulfate and sodium bisulfite for 68, 70, 72, TABLE J.—CHROMIUM OXIDE-CONTAINING MAGNETIC TAPES WITH, AS BINDERS, COMBINATIONS OF PREFORMED ACRYLATE COPOLYMERS AND TERTIARY AMINE-CONTAINING COPOLYMERS; STEARAMIDE AND CROSSLINKING (HARDENING) AGENT AS FURTHER ADDITIVES

[$CrO_2$=41%, by volume, of total solids]

| | Preformed polymer | | Tertiary amine-containing dispersant-stabilizer copolymer | | | Tape properties | | |
|---|---|---|---|---|---|---|---|---|
| Ex. No. | Monomers and proportions by weight | Inherent viscosity | Monomers and proportions by weight | Weight percent, based on $CrO_2$ | Other additives, weight percent based on $CrO_2$ | IHC, oersteds | $P/W$ | Stability, $t_{10}$ at 65° C./50% RH |
| 82 | BMA/BA/HBVE (45/45/10) | 2.46 | BMA/MVP (80/20) | 6 | None | | | 24.0 |
| 83 | do | 2.46 | BMA/MVP (80/20) | 6 | Stearamide (0.3%) plus XL-1 (1%). | 440 | 30 | 16.0 |
| 84 | BMA/BA/N-methyl acrylamide (42/42/16) | 0.43 | BMA/MVP (80/20) | 6 | None | 435 | 39 | 31.0 |
| 85 | do | 0.43 | BMA/MVP (80/20) | 6 | Stearamide (0.3%) plus XL-1 (1%). | 435 | 42 | 18.4 |
| 86 | BMA/BA/methacrylamide (45/45/10) | 0.27 | BMA/MVP (80/20) | 6 | None | 435 | 41 | 28.0 |
| 87 | do | 0.27 | BMA/MVP (80/20) | 6 | Stearamide (0.3%) plus XL-1 (1%). | 435 | 41 | 17.4 |
| 88 | BMA/BA/GMA (45/45/10) | 0.70 | BMA/MVP (80/20) | 6 | None | 435 | 26 | 20.3 |
| 89 | do | 0.70 | BMA/MVP (80/20) | 6 | Stearamide (0.3%) plus XL-1 (1%). | | | 11.0 |
| 90 | BMA/BA (50/50) | 2.12 | BMA/MVP (80/20) | 6 | None | 420 | | 36.0 |
| 91 | do | 1.70 | BMA/MVP (80/20) | 7 | Stearamide (0.3%) plus XL-1 (1%). | 435 | 35 | 20.0 |
| 92 | do | 1.70 | BMA/MVP (80/20) | 12 | None | 420 | | 39.0 |
| 93 | do | 1.70 | BMA/MVP (80/20) | 14 | Stearamide (0.3%) plus XL-1 (1%). | 435 | 53 | 18.0 |
| 94 | do | 1.70 | BMA/MVP (80/20) | 24 | None | 420 | 46 | 39.5 |
| 95 | do | 1.70 | BMA/MVP (80/20) | 21 | Stearamide (0.3%) plus XL-1 (1%). | 435 | 59 | 27.0 |
| 96 | do | 1.70 | MMA/MVP (90/10) | 6 | None | 425 | 27 | 28.5 |
| 97 | do | 1.70 | MMA/MVP (90/10) | 5.5 | Stearamide (0.3%) plus XL-1 (1%). | 435 | 27 | 20.0 |
| 98 | do | 1.70 | MMA/MVP (90/10) | 12 | None | 430 | 23 | 43.0 |
| 99 | do | 1.70 | MMA/MVP (90/10) | 10 | Stearamide (0.3%) plus XL-1 (1%). | 435 | 35 | 28.0 |
| 100 | do | 1.70 | MMA/MVP (90/10) | 21 | do | 445 | 40 | 40.0 |
| 101 | do | 1.70 | MA/MVP (84/16) | 14 | do | 430 | 40 | 20.0 |

NOTE.—Abbreviations: BMA=Butyl methacrylate; BA=Butyl acrylate; HBVE=4-Hydroxybutyl vinyl ether; GMA=Glycidyl methacrylate; MVP=2-methyl-5-vinylpyridine; MMA=Methyl methacrylate; MA=Methyl acrylate; XL-1=2,4-Toluenediisocyanate/trimethylolpropane (3/1) crosslinking (hardening) agent.

While the acrylic and methacrylic acid ester polymers used in Examples 67–101 of this specification are also old, details of the solution and emulsion polymerization of most of the same are given in the following Table K. The preparations of the polymers are again referred to as "runs" to distinguish them from the examples proper.

Emulsion polymerization in an aqueous medium was used for all runs except those of 84–89, inclusive, for which solution polymerization in an organic solvent with Vazo® vinyl polymerization catalyst (azobisisobutyronitrile) as initiator was used. The organic solvent was benzene for runs 88 and 89, and methyl isobutyl ketone for 73, 77–81 and 90; ammonium persulfate and sodium bisulfite for 76; and α,α′-azobis(isobutyramidine hydrochloride) for 67, 69, 71, 74, 75, 82 and 83. Arquad® HT-50 (Armour Industrial Chemical Co.) was used as a dispersing agent for runs 67, 69, 71, 74–76, 82 and 83, and sodium lauryl sulfate for 68, 70, 72, 73, 77–81 and 90. A small amount of 1-dodecanethiol was used in runs 67–70, 72–74, 77–83 and 90. Conditions of time, temperature and recovery were conventional. Inherent viscosity of the product was measured using a 0.1% solution in chloroform at 25° C. The glass transition temperature ($T_g$) was determined by differential thermal analysis.

TABLE K.—PREPARATION OF HOMOPOLYMERS AND COPOLYMERS OF ACRYLIC AND METHACRYLIC ACID ESTERS

| | | Conditions | | Result | | Polymer | |
|---|---|---|---|---|---|---|---|
| Polymer used in Example No.— | Monomers, g.[a] | Temp., ° C. | Time, hr. | Emulsion, g. | Percent solids | Inherent viscosity | $T_g$, ° C. |
| 67 | EA, 134 | 66 | 4 | 526 | 24 | 3.51 | −17 |
| 68 | BA, 100 | 40 | 4 | 529 | | 3.00 | −51 |
| 69 | BMA, 67; BA, 67 | 62 | 4 | 533 | 24.5 | 1.95 | |
| 70 | BMA, 50; BA, 50 | 42–46 | 1.75 | 509 | | 1.08 | |
| 71 | BMA, 45; BA, 45; MVP, 10 | 65 | 4 | 484 | 18 | 3.50 | |
| 72 | MMA, 50; BMA, 50 | 40–44 | 5 | | | 0.75 | |
| 73 | MMA, 50; BA, 50 | 40–42 | 5.3 | 533 | | 1.43 | |
| 74 | MMA, 25; BA, 75 | 65 | 4 | 495 | 18.5 | 2.64 | −35 |
| 75 | VAc, 67[b]; BA, 67 | 65–73 | 5 | 521 | 25.5 | 2.84 | −31 |
| 76 | BA, 24; $VCl_2$, 100[b] | 40–50 | 3.5 | 512 | 20.5 | 0.75 | (c) |
| 77–81 | BMA, 50; BA, 50 | 40–43 | 7 | 561 | | 2.26 | −25 |
| 82, 83 | BA, 45; BMA, 45; HBVE, 10 | 65 | 4 | 488.5 | 19 | 2.46 | |
| 90 | BMA, 50; BA, 50 | 40–45 | 7 | 531.5 | | 2.12 | −33 |
| 84, 85 | BMA, 22; BA, 22; N-methylacrylamide,[b] 8.0 | 80 | 9 | | 35 | 0.43 | |
| 86,87 | BMA, 22; BA, 22; Methacrylamide, 5.0 | 82–83 | 7 | | 33 | 0.27 | |
| 88, 89 | BMA, 45; BA, 45; GMA, 10 | 80–81 | 7 | 268 | 34 | 0.70 | |
| 91–101 | BMA; BA | Details described in text | | | | 1.70 | −34 |

[a] Used commercial grade monomers except where noted that the monomer was distilled.
[b] Distilled monomer.
[c] −35, minor; +9, major.

NOTE.—Abbreviations: BMA=Butyl methacrylate; BA=Butyl acrylate; HBVE=4-hydroxybutyl vinyl ether; GMA=Glycidyl methacrylate; MVP=2-methyl-5-vinylpyridine; MMA=Methyl methacrylate; MA=Methyl acrylate.

Example 102

By procedures similar to those of Example 41, a tape was made with a magnetic coating that comprised, by weight, 78.80% of ferromagnetic chromium oxide, 15.84% of the soluble polyester-polyurethane resin of Example 41, 4.18% of methyl acrylate/2-methyl-5-vinylpyridine (85/15) copolymer, 0.72% of 2,4-toluene diisocyanate/trimethylolpropane (3/1), and 0.46% of squalane (2,6,10,15,19,23-hexamethyl tetracosane). The resultant magnetic tape had an excellent combination of output, runnability and wear resistance as determined on commercial digital tape transports.

Example 103

A magnetic tape was prepared as in Example 102, above, except that the squalane was replaced with butyl laurate. The tape had excellent output, runnability, and wear resistance.

Example 104

A magnetic tape was prepared as in Example 102, above, with a magnetic coating that comprised, by weight, 83.17% of ferromagnetic chromium oxide, 3.3% of methyl acrylate/2-methyl-5-vinylpyridine (85/15) copolymer, 0.14% of stearamide, 0.57% of 2,4-toluene diisocyanate/trimethylolpropane (3/1), and 12.82% of the soluble polyester-polyurethane of Example 102. The tape had excellent output, runability, and wear resistance.

Example 105

A magnetic tape was prepared as in Example 102 with a magnetic coating that comprised, by weight, 79.19% of ferromagnetic chromium oxide, 4.3% of methyl acrylate/2-methyl-5-vinylpyridine (85/15) copolymer, 0.19% of stearamide, 1.7% of squalane, 0.74% of 2,4-toluene diisocyanate/trimethylolpropane (3/1), and 13.88% of the soluble polyester-polyurethane of Example 102. The tape had excellent adhesion, blocking, and wear-resistance characteristics.

Examples 106–111

The materials and procedures of Example 102 were used to make the compositions described in Table L, wherein are given percentages by weight of the total magnetic coating composition exclusive of substrate. Performance of tapes made from the compositions of Table L was comparable to that of the tape of Example 102.

TABLE L.—COMPOSITIONS BY WEIGHT PERCENT

| Component | Example | | | | | |
|---|---|---|---|---|---|---|
| | 106 | 107 | 108 | 109 | 110 | 111 |
| Ferromagnetic chromium oxide | 78.8 | 79 | 79 | 79 | 79 | 82 |
| Preformed polyester-polyurethane resin | 15.47 | 15.68 | 14.89 | 14.78 | 13.16 | 13.14 |
| Methyl acrylate/2-methyl-5-vinyl pyridine (85/15) copolymer | 4.17 | 4.13 | 4.13 | 3.88 | 5.52 | 3.54 |
| 2,4-toluene diisocyanate/trimethylolpropane (3/1) | 0.72 | 0.71 | 0.71 | 0.65 | 0.63 | 0.61 |
| Squalane | 0.84 | 0.42 | 1.26 | 1.68 | 1.68 | 0.72 |

Example 112

This example illustrates the use of a compound or mixed lubricant in one formulation.

The materials of Examples 102–111 were used to make a magnetic tape with a coating of the following weight-percent composition:

| | |
|---|---|
| Ferromagnetic chromium oxide | 77.7 |
| Preformed polyester-polyurethane resin | 15.5 |
| Methyl acrylate/2-methyl-5-vinylpyridine (85/15) copolymer | 4.1 |
| 2,4-toluene diisocyanate/trimethylolpropane (3/1) | 2.0 |
| Lubricants: | |
| (a) Stearamide | 0.16 |
| (b) Squalane | 0.44 |
| Total | 0.6 |

When tested on commercial digital tape transports, this tape exhibited excellent characteristics of output, runability and wear resistance.

Similar results were obtained from other samples whose compositions ranged as follows:

| | Percent |
|---|---|
| Ferromagnetic chromium oxide | 75–83 |
| Preformed polyester-polyurethane resin | 13–17 |
| Methyl acrylate/2-methyl-5-vinylpyridine (about 85/15) copolymer | 3.5–8.0 |
| 2,4-toluene diisocyanate/trimethylolpropane (about 3/1) | 0.5–5.0 |
| Lubricant(s) | 0.3–2.0 |

Although examples of this invention describe the use of uncoated poly(ethylene terephthalate) as the base film to which the tertiary amine-containing compositions of the invention are applied, other macromolecular, flexible organic polymeric films or supports may be used. Such supports include, for example, those made from polypropylene, poly(hexamethylene adipamide), poly(vinyl chloride), cellulose acetate, paper, and various polyesters formed by condensation of acids such as terephthalic, adipic, and isophthalic with glycols, such as ethylene glycol, diethylene glycol, and butanediol. It is likewise within the scope of the invention to use base films to which one or more subcoatings have been applied by known methods—see, for example, Alles, U.S. Pat. 2,627,088, and Carothers, U.S. Pat. 2,216,736—to impart special properties, e.g., improved adhesion. Subcoatings that may be used include vinylidene chloride copolymers, acrylic and methacrylic acid ester polymers and copolymers, linear polyester polymers and copolymers prepared, for example, from one or more of adipic acid, isophthalic acid, terephthalic acid, and sebacic acid with one or more of various glycols such as ethylene glycol and butanediol, and other materials. The subcoatings may themselves contain adjuvants, e.g., polyfunctional hydrocarbyl silicon compounds and Quilor® Werner-type chromium complexes, to improve bonding, both to the base film and to the tertiary amine-containing compositions of the invention.

The tertiary amine-containing compositions of this invention are also useful in a variety of magnetic applications other than the magnetic tapes of the examples. Magnetic recording members may be produced by uniformly spreading thin films of the dispersed compositions onto the surface of sheets, cylinders, drums or disks of various nonmagnetic materials, optionally magnetically orienting the chromium oxide component as described earlier, and drying. Alternatively, the compositions of the invention may be fashioned into any unsupported desired shape, e.g., cylinders and disks, and used as such in magnetic applications. As described in the assignee's copending application Nacci Ser. No. 636,955, filed May 8, 1967, recording members may be prepared by depositing the compositions in a plurality of small, closely spaced, patterned grooves, dots or depressions in the surface of sheets, films, cylinders, drums or disks.

Figure 3:
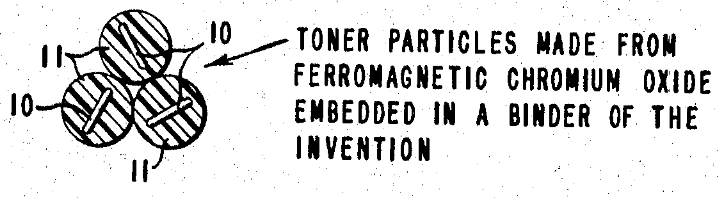
FIG. 3 (not in scale) shows small spheres of a magnetic toner in which numeral 10 represents anisotropic particles of a ferromagnetic chromium oxide embedded in a binder 11 of this invention.

Compositions of the invention may be converted into magnetic "toners." The use as toners of magnetic particles encapsulated in low-melting organic binders (see FIG. 3) is well-known in the art and is described, for example, by Wilkinson et al., in U.S. Pat. No. 2,826,634, and by Hall and Young in U.S. patent application Ser. No.

767,977. Toners are useful inter alia in transferring magnetically developed images to paper. For toner use, approximately 60–80% by weight of ferromagnetic chromium oxide is encapsulated in the tertiary amine-containing polymeric binders of this invention. Small amounts of the order of 1–5% by weight of additives such as carbon black, dyes, and stearamide or silicone derivatives to facilitate transfer to paper, may be added as desired.

The toners are prepared by milling together in desired proportions ferromagnetic chromium oxide, tertiary amine-containing polymeric dispersant-stabilizer, and one or more of the additional binders described herein, with, if desired, other additives, in a solvent or solvent mixture for the several polymers. After separating the ceramic balls used in milling, the dispersion is diluted and spray-dried in conventional manner at a nonvolatiles content of about 20% by weight, e.g., by dropping the diluted dispersion onto a disk rotating at high speed or by using a conventional spray-drying nozzle. Drying is effected in a chamber through which a heated gas is flowing. Gas flow and temperature are adjusted in known manner to remove solvent quickly leaving discrete, free-flowing, approximately spherical toner particles preferably about 3–20 microns in size.

It will be evident that other devices can, in general, be made up from ferromagnetic chromium dioxide and the binder systems of this invention in essentially the same manner as the recording members and toners described above. The tertiary amine-containing polymers which form the improvement of this invention and conventional nonmagnetic synthetic polymeric binder material are mixed together either by melting or dissolution in a suitable solvent(s), any desired hardening or crosslinking agent, lubricant or other adjuvant being added to the same mixture. (Lubricants, in particular, are obviously not needed for all utilities of the compositions.) Ferromagnetic chromium oxide, up to 98% by weight, is then added and the entire mixture hardened. Molding or extrusion operations may be accomplished before hardening occurs as desired. For example, compositions of the invention, along with other magnetic materials, may be fashioned into shaped articles for use as coil cores in electronic equipment. Such cores are especially useful where high coercivity and remanence of the magnetic component are desired.

Recording members prepared in accordance with this invention are of high quality and exceptional stability and may be employed in any of the uses where magnetic recording is employed. For example, they may be used for audio and television recording, for instrumentation and computer applications, and in various types of control equipment. The improved stability of the recording members as well as the other devices is a characteristic feature which renders them particularly useful in those applications where they are to be stored for long periods of time under conditions of high temperature and high humidity.

The embodiments of the invention in which an exclusive property or privilege is claimed are defined as follows:

1. A magnetic recording member comprising a magnetizable layer formed from fine, acicular ferromagnetic chromium oxide particles (1–98%, by weight, of the magnetizable layer) dispersed in a synthetic organic polymeric binder system 1–90% of the volume of which is formed from at least one basic tertiary amine-containing synthetic polymeric material at least 0.1% by weight of which is tertiary amino nitrogen, the tertiary amine moiety of said basic polymeric material having a $pK_a$ of 3–11 when measured in water at 20–35° C.

2. The recording member of claim 1 wherein the magnetizable layer contains about 65–85%, by weight, of ferromagnetic chromium oxide and the binder system contains about 10–50%, by volume, of basic tertiary amine-containing synthetic polymeric material.

3. The recording member of claim 2 wherein the basic polymeric material is a copolymer of 2-methyl-5-vinylpyridine and at least one other polymerizable ethylenically unsaturated monomer.

4. The recording member of claim 2 wherein the basic polymeric material is a copolymer of 2-methyl-5-vinylpyridine and methyl methacrylate.

5. The recording member of claim 2 wherein the basic polymeric material is a copolymer of 2-methyl-5-vinylpyridine and butyl methacrylate.

6. The recording member of claim 2 wherein the basic polymeric material is a copolymer of 2-methyl-5-vinylpyridine and styrene.

7. The recording member of claim 2 wherein the basic polymeric material is a copolymer of 2-methyl-5-vinylpyridine and methyl acrylate.

8. The recording member of claim 2 wherein the basic polymeric material is a copolymer of a vinylpyridine and at least one other polymerizable ethylenically unsaturated monomer.

9. The recording member of claim 2 wherein the basic polymeric material is a copolymer of 2-vinylpyridine and methyl methacrylate.

10. The recording member of claim 2 wherein the basic polymeric material is a copolymer of 4-vinylpyridine and methyl methacrylate.

11. The recording member of claim 2 wherein the basic polymeric material is a copolymer of a dialkylaminoethyl methacrylate and at least one other ethylenically unsaturated monomer.

12. The recording member of claim 2 wherein the basic polymeric material is a copolymer of 2-(N,N-dimethylamino)ethyl methacrylate and methyl methacrylate.

13. The recording member of claim 2 wherein the basic material is a homopolymer.

14. The magnetic recording member of claim 2 having a binder comprising, besides basic tertiary amine-containing synthetic polymeric material, 90–50% by volume of a second polymer, an elastomeric polyesterpolyurethane resin.

15. The magnetic recording member of claim 14 containing, as a hardening agent, 2,4-toluene diisocyanate/trimethylolpropane.

16. The magnetic recording member of claim 14 containing, as a hardening agent, 4,4'-methylenebis(cyclohexyldiisocyanate).

17. The magnetic recording member of claim 2 having a binder comprising, besides basic tertiary amine-containing synthetic polymeric material, 90–50% by volume of a second polymer, a vinylidene chloride/acrylonitrile copolymer.

18. The magnetic recording member of claim 2 having a binder comprising, besides basic tertiary amine-containing synthetic polymeric material, 90–50% by volume of a mixture of an elastomeric polyester-polyurethane resin and a vinylidene chloride/acrylonitrile copolymer.

19. The magnetic recording member of claim 2 having a binder comprising, besides basic tertiary amine-containing synthetic polymeric material, 90–50% by volume of a second polymer, a homopolymer or inter se copolymer of an acrylic or methacrylic acid ester or a copolymer of one of these esters with another polymerizable ethylenically unsaturated monomer.

20. The magnetic recording member of claim 19 wherein the second polymer is a homopolymer of ethyl acrylate.

21. The magnetic recording member of claim 19 wherein the second polymer is a homopolymer of butyl acrylate.

22. The magnetic recording member of claim 19 wherein the second polymer is a copolymer of butyl methacrylate and butyl acrylate.

23. The magnetic recording member of claim 19 wherein the second polymer is a copolymer of methyl methacrylate and butyl acrylate.

24. The magnetic recording member of claim 2 wherein the binder system additionally contains at least one lubricant.

25. The magnetic recording member of claim 24 containing squalane.

26. The magnetic recording member of claim 2 in which the magnetizable layer consists essentially of, by weight:

(a) about 68–84% of a ferromagnetic chromium oxide;
(b) 12–25% of a soluble polyester-polyurethane resin made from diphenylmethane diisocyanate, adipic acid, and an alkanediol of 2–4 carbon atoms or mixtures of such alkanediols;
(c) 2–8.0% of a methyl acrylate/2 - methyl-5-vinylpyridine (90/10 to 80/20) copolymer;
(d) 0.2–5.0% of a hardening agent made from 2,4-toluene diisocyanate and trimethylolpropane (about 3/1); and
(e) 0.1–2.0% of lubricant(s).

27. The magnetic recording member of claim 2 in which the magnetizable layer consists essentially of, by weight:

(a) about 65–84% of a ferromagnetic chromium oxide;
(b) 13–26% of a mixture of (1) a soluble polyester-polyurethane resin made from diphenylmethane diisocyanate, adipic acid, and an alkanediol of 2–4 carbon atoms or mixtures of such alkanediols; with (2) a vinylidene chloride/acrylonitrile copolymer in proportions of (1) to (2) ranging from 60/40 to 40/60;
(c) 2–7.5% of a methyl methacrylate/2-methyl - 5-vinylpyridine (90/10 to 80/20) copolymer;
(d) 0.2–3.0% of a hardening agent made from 2,4-toluene diisocyanate and trimethylolpropane (about 3/1); and
(e) 0.1–2.0% of lubricant(s).

28. The magnetic recording member of claim 2 in which the magnetizable layer consists essentially of, by weight:

(a) about 73–85% of a ferromagnetic chromium oxide;
(b) 10–25% of a butyl methacrylate/butyl acrylate copolymer (about 50/50);
(c) 1.5–15% of a methyl methacrylate/2-methyl-5-vinylpyridine (90/10 to 80/20) copolymer;
(d) 0.2–5.0% of a hardening agent made from 2,4-toluene diisocyanate and trimethylolpropane (about 3/1); and
(e) 0.1–2.0% of lubricant(s).

29. The magnetic recording member of claim 2 in which the magnetizable layer consists essentially of, by weight:

(a) about 73–85% of a ferromagnetic chromium oxide;
(b) 10–25% of a butyl methacrylate/butyl acrylate copolymer (about 50/50);
(c) 1.5–15% of a butyl methacrylate/2-methyl - 5-vinylpyridine (90/10 to 80/20) copolymer;
(d) 0.2–5.0% of a hardening agent made from 2,4-toluene diisocyanate and trimethylolpropane (about 3/1) and
(e) 0.1–2.0% of lubricant(s).

30. The magnetic recording member of claim 2 comprising a flexible magnetic tape in which the magnetizable layer is attached to a macromolecular, flexible organic polymeric tape base.

31. The magnetic tape of claim 30 in which the tape base is formed from poly(ethylene terephthalate).

32. The magnetic tape of claim 30 in which the magnetizable layer consists essentially of, by weight:

(a) about 75–83% of a ferromagnetic chromium oxide;
(b) about 13–17% of a soluble polyester-polyurethane resin made from diphenylmethane diisocyanate, adipic acid, and an alkanediol of 2–4 carbon atoms or mixtures of such alkanediols;
(c) about 3.5–8.0% of a methyl acrylate/2-methyl - 5-vinylpyridine copolymer (about 85/15);
(d) about 0.5–5.0% of 2,4-toluene diisocyanate/-trimethylolpropane (about 3/1); and
(e) about 0.3–2.0% of lubricant(s).

33. A magnetic composition consisting essentially of particulate ferromagnetic chromium oxide (1–98%, by weight, of the composition) bound together by a binder comprising, in intimate admixture, (a) from about 99 to about 10% by volume of at least one nonmagnetic, synthetic organic polymeric binder material, and
(b) from about 1 to about 90% by volume of at least one basic tertiary amine-containing synthetic polymeric material at least 0.1% by weight of which is tertiary amino nitrogen, the tertiary amine moiety of said basic polymeric material having a $pK_a$ of 3–11 when measured in water at 20–35° C.

34. A magnetic composition of claim 33 wherein the nonmagnetic synthetic organic polymeric binder material is at least one member of the group consisting of elastomeric polyester-polyurethanes, copolymers of vinylidene chloride and acrylonitrile, and homopolymers or inter se copolymers of acrylic or methacrylic acid esters.

35. A magnetic composition of claim 33 wherein the basic amine-containing synthetic polymeric material is a copolymer of a vinylpyridine.

36. A magnetic composition of claim 33 containing, additionally, a hardening agent.

37. A magnetic composition of claim 36 comprising, by weight:

(a) about 68–84% of ferromagnetic chromium oxide;
(b) 12–25% of a soluble polyester-polyurethane resin made from diphenylmethane diisocyanate, adipic acid, and an alkanediol of 2–4 carbon atoms or mixtures of such alkanediols;
(c) 2–8% of a methyl acrylate/2-methyl-5-vinylpyridine (98/2 to 50/50) copolymer; and
(d) 0.2–5.0% of a polyisocyanate hardening agent made from 2,4-toluene diisocyanate and trimethylolpropane.

38. A magnetic composition of claim 36 comprising, by weight;

(a) about 65–84% of ferromagnetic chromium oxide;
(b) 13–26% of a mixture of (1) a soluble polyester-polyurethane resin made from diphenylmethane diisocyanate, adipic acid, and an alkanediol of 2–4 carbon atoms or mixtures of such alkanediols; with (2) a vinylidene chloride/acrylonitrile copolymer in proportions of (1) to (2) ranging from 60/40 to 40/60;
(c) 2.0–7.5% of a methyl methacrylate/2-methyl-5-vinylpyridine (98/2 to 50/50) copolymer; and
(d) 0.2–3.0% of a hardening agent made from 2,4-toluene diisocyanate and trimethylolpropane.

39. A magnetic composition of claim 36 comprising, by weight:

(a) about 73–85% of a ferromagnetic chromium oxide;
(b) 10–25% of a butyl methacrylate/butyl acrylate copolymer (about 50/50);
(c) 1.5–15% of a methyl methacrylate/2-methyl-5-vinylpyridine (90/10 to 80/20) copolymer; and
(d) 0.2–5.0% of a hardening agent made from 2,4-toluene diisocyanate and trimethylolpropane.

40. A magnetic composition of claim 36 comprising, by weight:

(a) about 73–85% of a ferromagnetic chromium oxide;
(b) 10–25% of a butyl methacrylate/butyl acrylate copolymer (about 50/50);
(c) 1.5–15% of a butyl methacrylate/2-methyl-5-vinylpyridine (90/10 to 80/20) copolymer; and
(d) 0.2–5.0% of a hardening agent made from 2,4-toluene diisocyanate and trimethylolpropane.

(References on following page)

References Cited

UNITED STATES PATENTS

| | | | |
|---|---|---|---|
| 3,033,811 | 5/1962 | Brown et al. | 260—29.4 |
| 3,061,598 | 10/1962 | Cornell | 260—89.5 |
| 3,144,352 | 8/1964 | Talley | 117—138.8 |
| 3,172,776 | 3/1965 | Manly | 117—93.2 |
| 3,200,007 | 8/1965 | Flowers | 117—138.8 |
| 3,228,882 | 1/1966 | Harle et al. | 252—625 |

TOBIAS E. LEVOW, Primary Examiner

A. P. DEMERS, Assistant Examiner

U.S. Cl. X.R.

96—1.5; 252—62.1; 260—39, 65, 67.5, 72, 79, 80.72, 80.73, 88.3, 849, 858